(12) United States Patent
Takeuchi et al.

(10) Patent No.: US 6,834,514 B2
(45) Date of Patent: Dec. 28, 2004

(54) EJECTOR CYCLE

(75) Inventors: Hirotsugu Takeuchi, Nagoya (JP); Hiroshi Oshitani, Toyota (JP); Mika Saito, Kariya (JP)

(73) Assignee: Denso Corporation, Kariya (JP)

(*) Notice: Subject to any disclaimer, the term of this patent is extended or adjusted under 35 U.S.C. 154(b) by 13 days.

(21) Appl. No.: 10/614,568

(22) Filed: Jul. 7, 2003

(65) Prior Publication Data

US 2004/0003608 A1 Jan. 8, 2004

(30) Foreign Application Priority Data

Jul. 8, 2002 (JP) .......................................... 2002-198884
Jul. 9, 2002 (JP) .......................................... 2002-200009

(51) Int. Cl.[7] .............................. F25B 41/00; F25B 1/06; F25B 43/02
(52) U.S. Cl. ................................ 62/500; 62/170; 62/84
(58) Field of Search ............................. 62/500, 170, 84, 62/191, 192

(56) References Cited

U.S. PATENT DOCUMENTS 6,550,265 B2 * 4/2003 Takeuchi et al. ............ 62/324.2
2003/0140651 A1 * 7/2003 Takeuchi et al. .............. 62/500
2003/0209032 A1 * 11/2003 Ohta ............................. 62/500

FOREIGN PATENT DOCUMENTS

JP        5-149652        6/1993

* cited by examiner

Primary Examiner—William C. Doerrler
(74) Attorney, Agent, or Firm—Harness, Dickey & Pierce, PLC

(57) ABSTRACT

In an ejector cycle having an ejector for decompressing refrigerant, a check valve is disposed in an oil return passage through which refrigerant including a lubrication oil is introduced from a refrigerant outlet side of an evaporator to a refrigerant suction side of a compressor while bypassing the ejector. When the lubrication oil amount staying in the evaporator reduces, the check valve is automatically closed, and a normal operation mode of the ejector cycle is automatically set. On the contrary, when a large amount of lubrication oil stays in the evaporator, the check valve is automatically opened, and an oil return mode is automatically set. Therefore, the lubrication oil staying in the evaporator can be controlled equal to or lower than a predetermined amount, thereby effectively returning the lubrication oil to the compressor.

17 Claims, 22 Drawing Sheets

US 6,834,514 B2

EJECTOR CYCLE

CROSS-REFERENCE TO RELATED APPLICATION

This application is related to and claims priority from Japanese Patent Applications No. 2002-198884 filed on Jul. 8, 2002 and No. 2002-200009 filed on Jul. 9, 2002, the contents of which are hereby incorporated by reference.

BACKGROUND OF THE INVENTION

1. Field of the Invention

The present invention relates to an ejector cycle with a refrigerant passage through which refrigerant including a lubrication oil is circulated directly by pumping operation of a compressor from an evaporator to a suction side of the compressor while bypassing at least a nozzle of an ejector.

2. Description of Related Art

Generally, as a vapor compression refrigerant cycle, an ejector cycle, an expansion-valve cycle or the like is used. In the expansion-valve cycle, refrigerant is decompressed by a decompression device such as an expansion valve in is enthalpic, and refrigerant decompressed in the decompression device flows into an evaporator. That is, in the expansion-valve cycle, refrigerant is circulated from a compressor to the compressor through a radiator, the expansion valve and the evaporator in this order, as a single refrigerant circuit. Therefore, refrigerant flowing into the evaporator can be directly sucked into the compressor.

On the other hand, in the ejector cycle, an ejector sucks refrigerant evaporated in an evaporator while decompressing and expanding refrigerant in a nozzle, and increases pressure of refrigerant to be sucked into a compressor by converting expansion energy to pressure energy. For example, in the ejector cycle described in JP-A-5-149652, the refrigerant from the ejector flows into a gas-liquid separator, and is separated into gas refrigerant and liquid refrigerant in the gas-liquid separator. Then, the liquid refrigerant separated in the gas-liquid separator is supplied to the evaporator, and the gas refrigerant separated in the gas-liquid separator is sucked into the compressor. However, in the ejector cycle, refrigerant is circulated from the compressor to the compressor through a radiator, the ejector and the gas-liquid separator in this order as a refrigerant flow (i.e., drive flow), and is circulated from the gas-liquid separator to the gas-liquid separator through the evaporator and the ejector in this order as the other refrigerant flow (i.e., suction flow). Therefore, refrigerant is circulated directly by the compressor in the drive flow, while refrigerant is circulated by a pumping function of the ejector. Thus, if the pumping function of the ejector reduces, a flow amount of the suction refrigerant from the evaporator to the ejector is reduced, and a lubrication oil mixed into refrigerant stays in the evaporator. Accordingly, in this case, heat absorbing performance of the evaporator is reduced, and an amount of lubrication oil returned to the compressor is reduced, thereby reducing lubricating efficiency of the compressor.

Further, in the ejector cycle, the gas-liquid separator stores liquid refrigerant to be supplied to the evaporator and the oil to be returned to the compressor. Because it is necessary to store a large amount of the liquid refrigerant and a large amount of the lubrication oil in the gas-liquid separator, the size of the gas-liquid separator is increased.

SUMMARY OF THE INVENTION

In view of the above-described problems of the present invention, it is an object of the present invention to provide an ejector cycle capable of preventing a large amount of a lubrication oil from staying in a low-pressure heat exchanger (i.e., evaporator).

It is an another object of the present invention to provide an ejector cycle that effectively reduces the size of a gas-liquid separator.

It is a further another object of the present invention to provide an ejector cycle that can reduces the lubrication oil staying in the low-pressure heat exchanger while reducing the size of the gas-liquid separator.

According to a first aspect of the present invention, an ejector cycle having an ejector includes a pipe member defining a refrigerant passage through which a refrigerant outlet side of a low-pressure heat exchanger is coupled to a refrigerant suction side of a compressor, and a switching means provided in the refrigerant passage to open and close the refrigerant passage. In the ejector cycle, when the switching means opens the refrigerant passage, at least refrigerant in the low-pressure heat exchanger is introduced to the refrigerant suction side of the compressor directly by the pumping operation of the compressor while bypassing the ejector. Accordingly, a lubrication oil amount staying in the low-pressure heat exchanger can be controlled equal to or smaller than a predetermined amount by introducing the refrigerant including the lubrication oil to the compressor through the refrigerant passage. Therefore, a sufficient amount of the lubrication oil can be returned to the compressor.

Further, the ejector cycle includes a gas-liquid separator for separating refrigerant from the ejector into gas refrigerant and liquid refrigerant, and the gas-liquid separator is disposed such that a gas refrigerant outlet of the gas-liquid separator is connected to the refrigerant suction side and a liquid refrigerant outlet is connected to a refrigerant inlet side of the low-pressure heat exchanger. In this case, the refrigerant including the lubrication oil can be directly introduced to the refrigerant suction side of the compressor by the operation of the compressor when an amount of the lubrication oil staying in the low-pressure heat exchanger is larger than a predetermined value. Therefore, the gas-liquid separator is not required to store a large amount of liquid refrigerant and a large amount of lubrication oil in the ejector cycle. Thus, the size of the gas-liquid separator can be reduced.

Specifically, in a normal operation mode where the switching means closes the refrigerant passage, the refrigerant in the low-pressure heat exchanger is sucked into the ejector by the high-speed refrigerant steam jetted from the nozzle. On the other hand, in an oil return mode (bypass mode) where the switching means opens the refrigerant passage, lubrication oil staying in the low-pressure heat exchanger is introduced directly by the pumping operation of the compressor to the compressor, together with the refrigerant flowing from the low-pressure heat exchanger to the refrigerant suction side of the compressor through the refrigerant passage.

For example, the switching means is disposed to open the refrigerant passage, when a refrigerant pressure at the refrigerant outlet side of the low-pressure heat exchanger becomes higher than a refrigerant pressure at the refrigerant suction side of the compressor, and when a pressure different between the refrigerant pressure at the refrigerant outlet side of the low-pressure heat exchanger and the refrigerant pressure at the refrigerant suction side of the compressor is larger than a predetermined value. Alternatively, the switching means is disposed to open the refrigerant passage when an ejector efficiency of the ejector becomes lower than a first predetermined value, and to close the refrigerant passage when the ejector efficiency of the ejector becomes higher than a second predetermined value. In this case, the first predetermined value can be equal to the second predetermined value, or can be different from the second predetermined value.

According to a second aspect of the present invention, in an ejector cycle having the ejector, a pipe member defining a refrigerant passage is provided such that refrigerant discharged from the compressor is introduced through the refrigerant passage toward the low-pressure heat exchanger while bypassing the nozzle of the ejector, and a switching means is provided in the refrigerant passage to open and close the refrigerant passage. In the ejector cycle, when the switching means opens the refrigerant passage, at least refrigerant in a low-pressure heat exchanger is introduced to the refrigerant suction side of the compressor while bypassing the nozzle of the ejector. Therefore, lubrication oil staying in the evaporator can be effectively introduced to the compressor by operation of the compressor. Specifically, a decompression device is disposed in the refrigerant passage for decompressing refrigerant discharged from the compressor. In this case, in the normal operation mode, the switching means closes the refrigerant passage, and the high-pressure refrigerant from the high-pressure heat exchanger is decompressed in the nozzle of the ejector while sucking refrigerant in the evaporator. On the other hand, in the oil return mode (bypass mode), the switching means opens the refrigerant passage, and the high-pressure refrigerant discharged from the compressor is decompressed in the decompression device and flows through the low-pressure heat exchanger. Therefore, in the oil return mode, the amount of the lubrication oil staying in the low-pressure heat exchanger can be effectively reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

Figure 1:
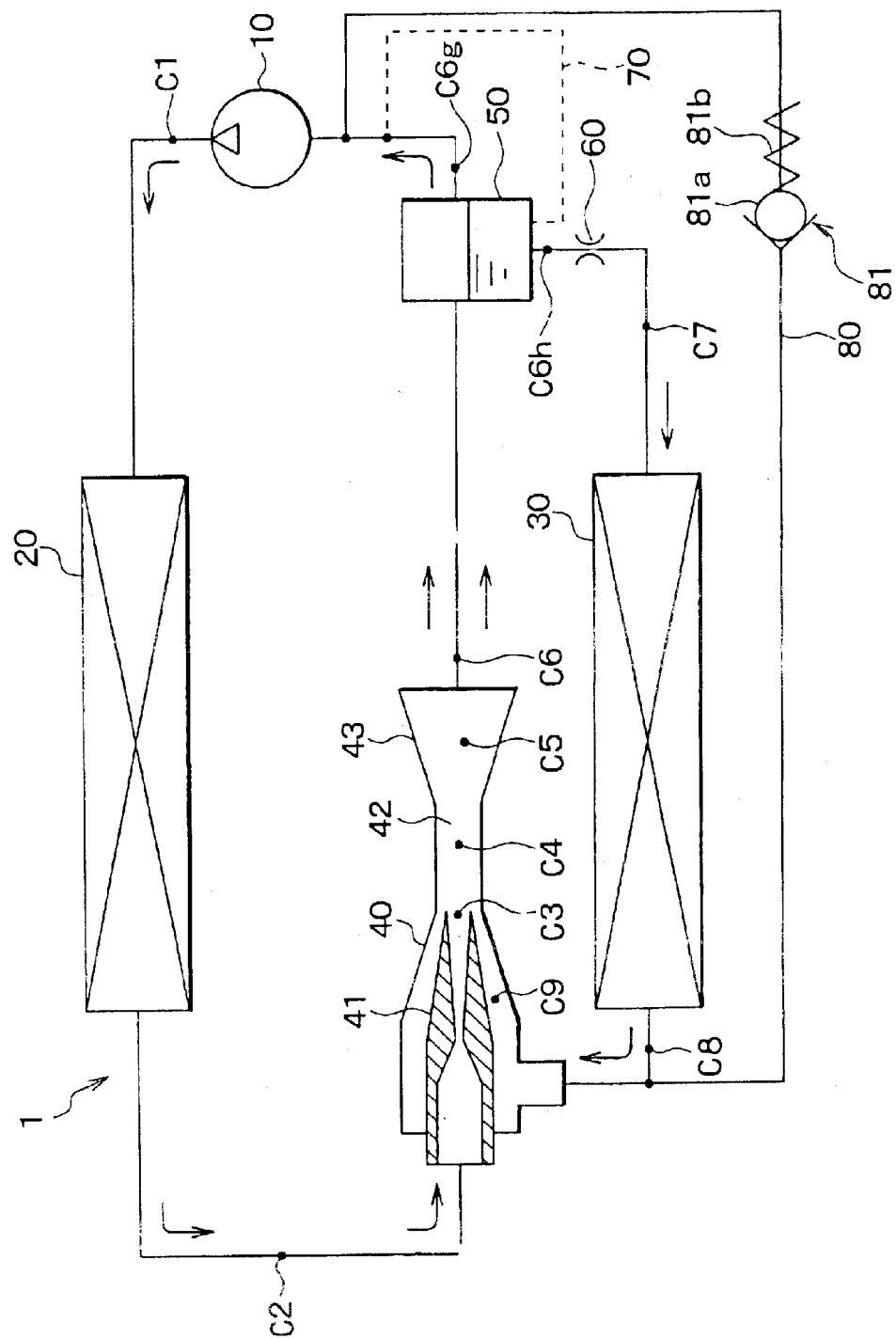
FIG. 1 is a schematic diagram showing an ejector cycle according to a first embodiment of the present invention.

In the first embodiment, an ejector cycle according to the present invention is typically used for a vapor compression refrigerator used for a showcase for refrigerating foods. In FIG. 1, a compressor 10 is an electric compressor for sucking and compressing refrigerant circulated in an ejector cycle 1. A radiator 20 is a high-pressure heat exchanger for cooling high-temperature and high-pressure refrigerant discharged from the compressor 10 by performing heat-exchange operation between outside air and the high-temperature and high-pressure refrigerant. Further, an evaporator 30 is a low-pressure heat exchanger for cooling air to be blown into the showcase by evaporating liquid refrigerant, more specifically, by performing heat-exchange operation between the air and low-pressure refrigerant. An ejector 40 sucks refrigerant evaporated in the evaporator 30 while decompressing and expanding refrigerant flowing out from the radiator 20 in a nozzle 41, and increases pressure of refrigerant to be sucked into the compressor 10 by converting expansion energy to pressure energy.

Figure 2:
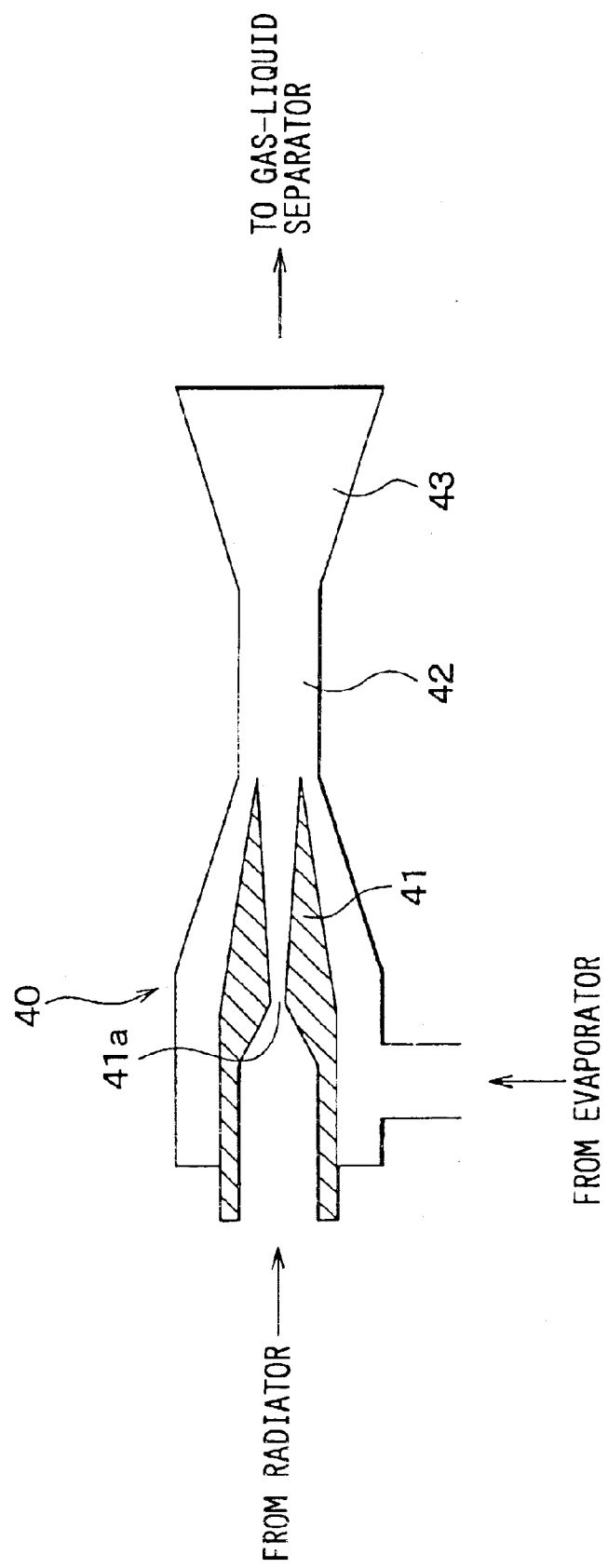
FIG. 2 is a schematic diagram showing an ejector used in the present invention.

As shown in FIG. 2, the ejector 40 includes the nozzle 41, a mixing portion 42, a diffuser 43 and the like. The nozzle 41 decompresses and expands high-pressure refrigerant flowing into the ejector 40 in isentropic by converting pressure energy of the high-pressure refrigerant from the radiator 20 to speed energy thereof. The mixing portion 42 sucks refrigerant evaporated in the evaporator 30 by using an entrainment function of high-speed refrigerant stream injected from the nozzle 41, while mixing the sucked refrigerant and the injected refrigerant. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

At this time, in the mixing portion 42, a drive stream of refrigerant from the nozzle 41 and a suction stream of the refrigerant from the evaporator 30 are mixed so that their momentum sum is conserved, thereby increasing refrigerant pressure as in the diffuser 43. In the diffuser 43, because a refrigerant passage sectional area gradually increases toward its outlet, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle 41a having the smallest passage area in its refrigerant passage. However, a nozzle tapered toward its outlet can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. A gas refrigerant outlet of the gas-liquid separator 50 is connected to a suction side of the compressor 10, and a liquid refrigerant outlet of the gas-liquid separator 50 is connected to a suction side of the evaporator 30. A throttle 60 is a decompression device for decompressing liquid refrigerant flowing out from the gas-liquid separator 50. A first oil return passage 70 is provided for returning lubrication oil, separated from refrigerant in the gas-liquid separator 50, to the suction side of the compressor 10. A second oil return passage 80 is a refrigerant passage for connecting a refrigerant outlet side of the evaporator 30 and a refrigerant suction side of the compressor 10. In the second oil return passage 80, a check valve 81 is provided. The check valve 81 allows a refrigerant flow in the second oil return passage 80 only in a direction from the refrigerant outlet side of the evaporator 30 to the refrigerant suction side of the compressor 10. A refrigerant flow amount in the second oil return passage 80 is controlled by opening and closing the check valve 81.

The check valve 81 includes a valve body 81a for opening and closing its valve opening, and a spring 81b for applying elastic force to the valve body 81a in a direction where its valve opening is closed. The valve body 81a and the spring 81b are set so that the second oil return passage 80 is opened when refrigerant pressure at the refrigerant outlet side of the evaporator 30 becomes higher than refrigerant pressure at the refrigerant suction side of the compressor 10 and when a pressure difference between the refrigerant pressure at the refrigerant outlet side of the evaporator 30 and the refrigerant pressure at the refrigerant suction side of the compressor 10 is larger than a predetermined pressure. In FIG. 1, a check valve having the other structure can be used as the check valve 81.

Figure 3:
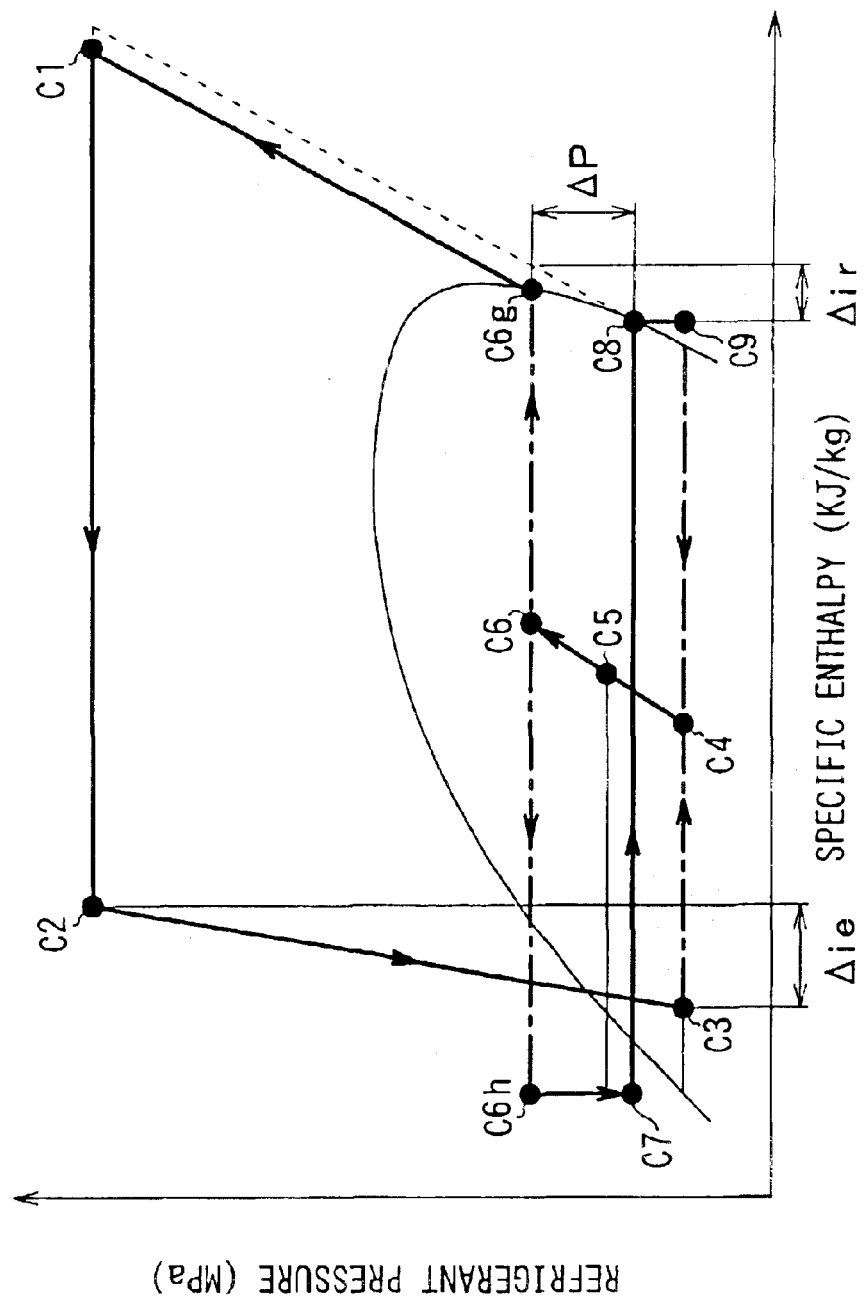
FIG. 3 is a Mollier diagram (p-h diagram) showing a relationship between a refrigerant pressure and a refrigerant specific enthalpy in the ejector cycle of the present invention.

In the first embodiment, carbon dioxide is used as refrigerant. As shown in FIG. 3, high-pressure refrigerant flowing into the nozzle 41 is higher than critical pressure of the refrigerant. In FIG. 3, reference numerals C1–C9 show refrigerant states at positions of the reference numerals C1–C9 shown in FIG. 1, respectively.

Next, operation of the ejector cycle 1 according to the first embodiment will be described.

(1) Normal Operation Mode

In the normal operation mode, refrigerant is discharged from the compressor 10, and flows into the radiator 20. Then, the refrigerant is cooled in the radiator 20, and flows into the nozzle 41 of the ejector 40. The refrigerant is decompressed and expanded by the nozzle 41 in isentropic, and flows into the mixing portion 42 at a speed equal to or higher than the sound velocity. Further, refrigerant evaporated in the evaporator 30 is sucked into the mixing portion 42 by a pumping operation using an entrainment function of the high-speed refrigerant flowing into the mixing portion 42. Therefore, low-pressure refrigerant is circulated from the gas-liquid separator 50 to the gas-liquid separator 50 through the throttle 60, the evaporator 30 and the pressure increasing portion of the ejector 40 in this order. On the other hand, the refrigerant sucked from the evaporator 30 and the refrigerant injected from the nozzle 41 are mixed in the mixing portion 42. Then, dynamic pressure of the mixed refrigerant is converted to static pressure thereof in the diffuser 43, and is returned to the gas-liquid separator 50.

(2) Oil Return Mode (Bypass Mode)

The oil return mode is automatically performed when ejector efficiency ηe reduces, or when the pumping function of the ejector 40 reduces. For example, the ejector efficiency ηe reduces when an outside air temperature is low, or when the lubrication oil equal to or more than a predetermined amount is stored in the evaporator 30. The ejector efficiency ηe is calculated by the following formula (1). Here, the denominator of the ejector efficiency ηe is defined by a product of a refrigerant mass flow amount Gn, flowing through the radiator 20, and an enthalpy difference Δie between enthalpy at a refrigerant inlet of the nozzle 41 and enthalpy at a refrigerant outlet thereof. Further, the numerator of the ejector efficiency ηe is defined based on a product of pressure recovery ΔP in the ejector 40 and a sum of the refrigerant mass flow amount Gn and a refrigerant mass flow amount Ge flowing through the evaporator 30. More specifically, the following formula (1) is defined in consideration of speed energy of refrigerant to be sucked into the ejector 40.

$$\eta e = \frac{\Delta P \frac{(Gn+Ge)}{\rho g} - Ge \frac{Ue^2}{2}}{\Delta ie \times Gn} = \frac{(Gn+Ge)\Delta ir - Ge \frac{Ue^2}{2}}{\Delta ie \times Gn} \quad (1)$$

wherein, Ue is a suction flow speed, ρg is a mass density of suction stream refrigerant gas, and Δir is ΔP/ρg.

Figure 4:
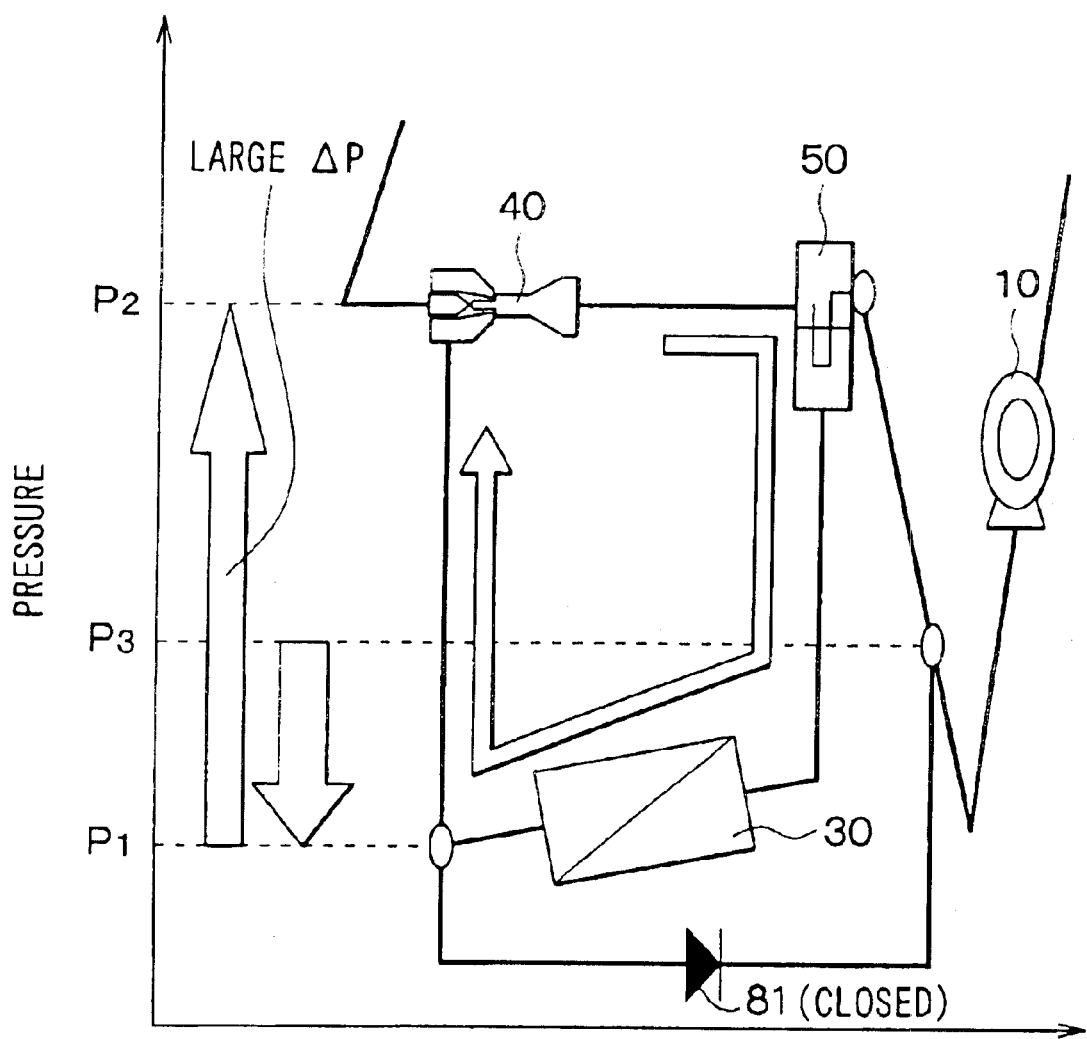
FIG. 4 is a schematic diagram for explaining operation of the ejector cycle in a large suction mode of the ejector, according to the first embodiment.

Specifically, when the pumping function of the ejector 40 is sufficiently large, the pressure recovery ΔP in the ejector 40, that is, pressure increasing value ΔP in the ejector 40 is large. Therefore, as shown in FIG. 4, in a large suction mode of the ejector 40, refrigerant pressure P3 at the refrigerant suction side of the compressor 10 becomes higher than refrigerant pressure P1 at the refrigerant outlet side of the evaporator 30. That is, refrigerant pressure larger than a predetermined value is applied to the check valve 81 so as to close the check valve 81. Therefore, in this case, the second oil return passage 80 is closed by the check valve 81, and refrigerant (including the lubrication oil) does not flows through the second oil return passage 80.

Figure 5:
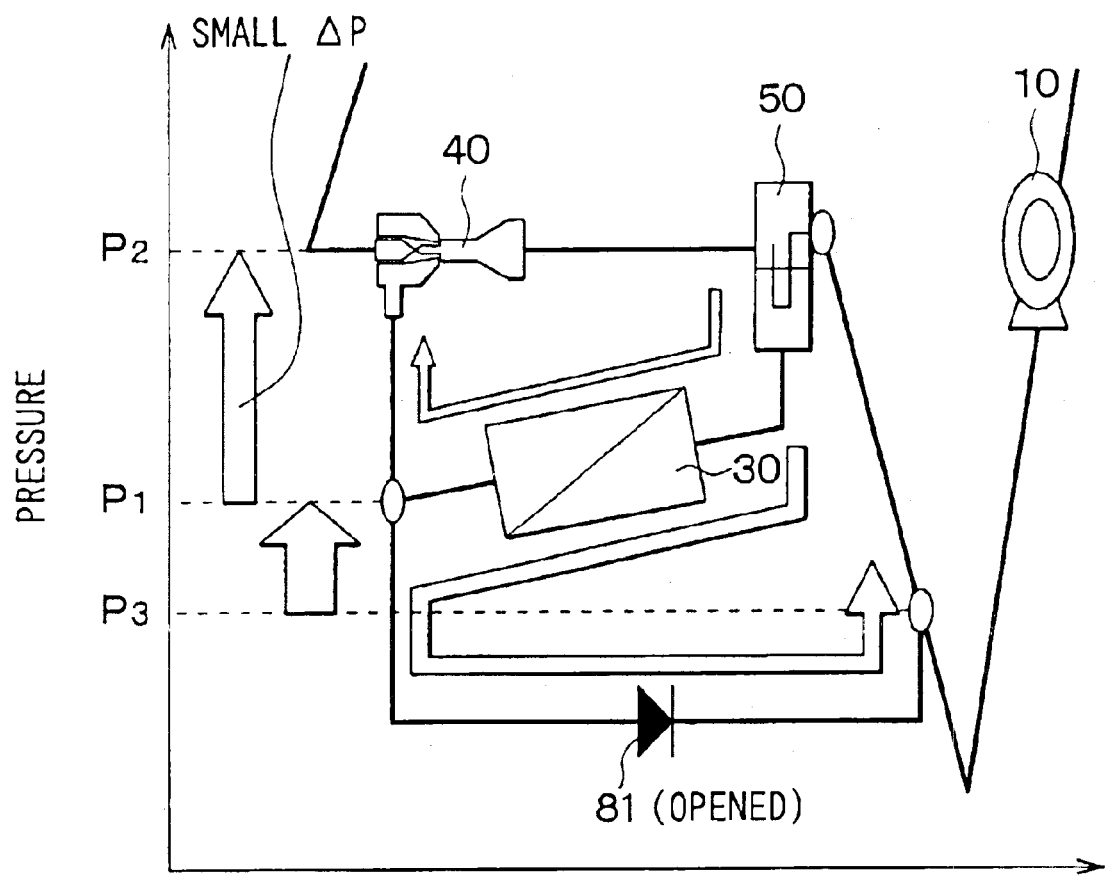
FIG. 5 is a schematic diagram for explaining operation of the ejector cycle in a small suction mode of the ejector, according to the first embodiment.

On the contrary, as shown in FIG. 5, when the pumping function of the ejector 40 becomes smaller (small suction mode), the refrigerant pressure P1 at the refrigerant discharge side of the evaporator 30 becomes higher than the refrigerant pressure P3 at the refrigerant suction side of the compressor 10. That is, in the small suction mode of the ejector 40, the check valve 81 is opened so that refrigerant flows through the second oil return passage 80. Thus, the refrigerant outlet side of the evaporator 30 directly communicates with the suction side of the compressor 10, and refrigerant including the lubrication oil in the evaporator 30 is introduced to the refrigerant suction side of the compressor 10 directly by the pumping operation of the compressor 10. Therefore, even if the pumping function of the ejector 40 is small, lubrication oil staying in the evaporator 30 flows toward the compressor 10, thereby preventing the lubrication oil from staying in the evaporator 30.

Further, when the amount of the lubrication oil staying in the evaporator 30 reduces, refrigerating performance of the evaporator 30 is increased, thereby increasing the drive flow amount and the suction flow amount in the ejector 40. Therefore, the pumping performance of the ejector 40 is improved, and the refrigerant pressure P3 at the refrigerant suction side of the compressor 10 becomes higher than the refrigerant pressure P1 at the refrigerant outlet side of the evaporator 30. That is, when the lubrication oil amount staying in the evaporator 30 reduces, the check valve 81 is automatically closed, so that the operation mode is automatically changed from the oil return mode to the normal operation mode. On the contrary, when the amount of lubrication oil staying in the evaporator 30 becomes larger than a predetermined value, the check valve 81 is automatically opened, so that the operation mode is automatically changed from the normal operation mode to the oil return mode.

Thus, in the first embodiment, the lubrication oil amount staying in the evaporator 30 can be controlled smaller than the predetermined value, thereby returning a sufficient amount of lubrication oil to the compressor 10. Accordingly, the gas-liquid separator 50 is not required to store a large amount of liquid refrigerant and a large amount of lubrication oil, thereby reducing the size of the gas-liquid separator 50.

Figure 6:
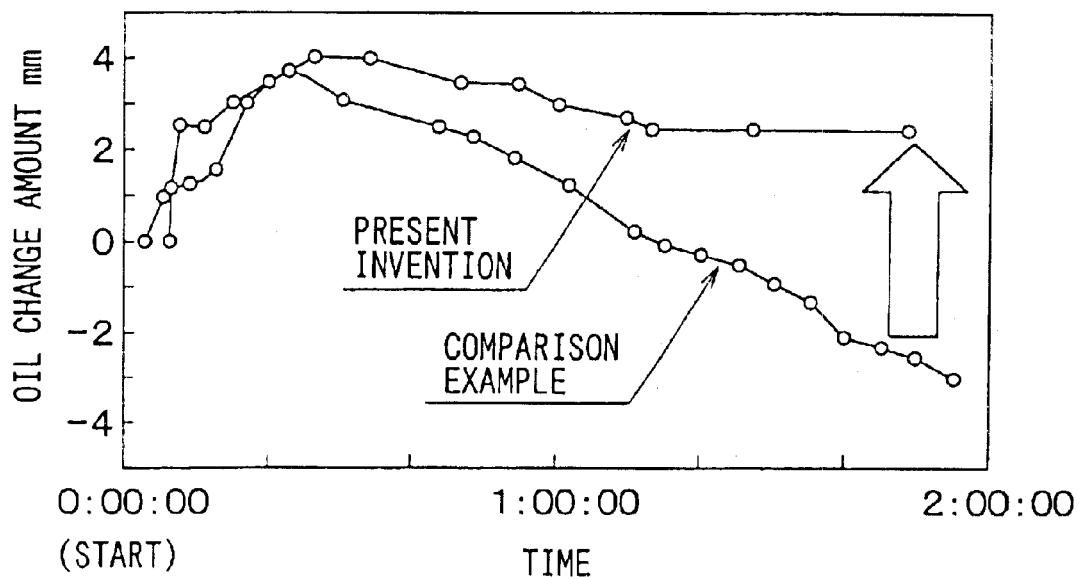
FIG. 6 is a graph showing a difference between an oil return effect of the ejector cycle according to the first embodiment and an oil return effect of an ejector cycle according to a comparison example.

An amount change of lubrication oil in the compressor 10 was tested in the ejector cycle 1 of the first embodiment and in an ejector cycle of a comparison example. In the ejector cycle of the comparison example, the second oil return passage 80 and the check valve 81 are not provided. The test was performed in a cool down operation for cooling the showcase at 30° C. of outside air temperature. Test results are shown in FIG. 6. In the first embodiment, the ejector cycle 1 is provided with the second oil return passage 80 and the check valve 81. Therefore, as shown in FIG. 6, in the first embodiment, a change amount of lubrication oil staying in the compressor 10 is maintained at a plus side. That is, the amount of lubrication oil staying in the evaporator 30 can be controlled equal to or smaller than the predetermined amount, and a sufficient amount of lubrication oil can be returned to the compressor 10. On the contrary, in the comparison example, because the second oil return passage 80 and the check valve 81 are not provided. Therefore, as shown in FIG. 6, the amount of lubrication oil staying in the compressor 10 changes to a minus side. That is, a large amount of lubrication oil stays in the evaporator 30, and a sufficient amount of lubrication oil cannot be returned to the compressor 10.

Figure 7:
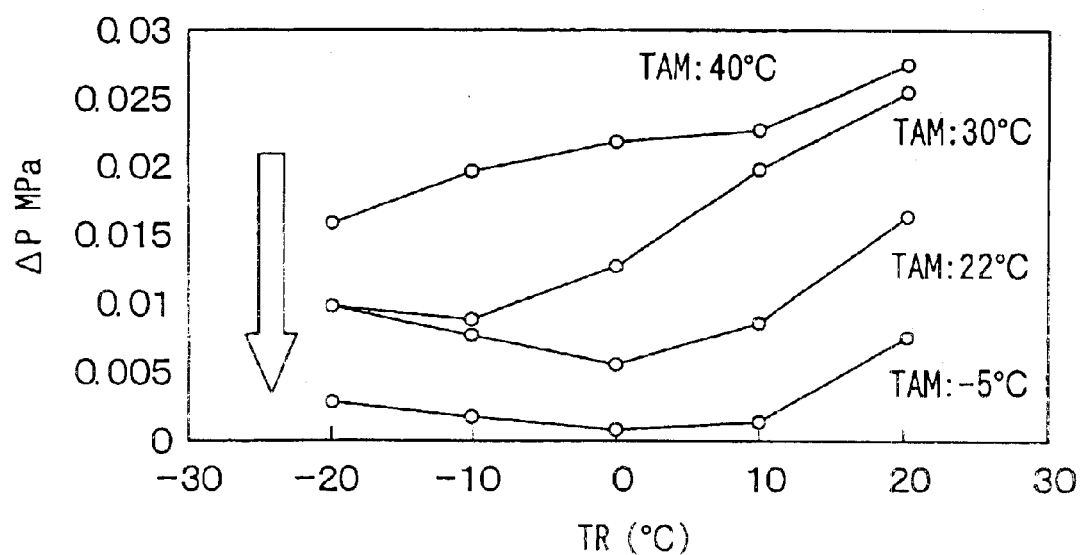
FIG. 7 is a graph showing a relationship between a pressure increasing value (ΔP) of the ejector, an inside air temperature (TR) in a showcase and an outside air temperature (TAM) outside the showcase.

Further, numerical simulation was performed between the pressure increasing value $\Delta P$ in the ejector 40 and an air temperature TR in the showcase, and between the pressure increasing value $\Delta P$ and an air temperature TAM outside the showcase, when the ejector efficiency $\eta e$ is about 40%. The numerical simulation results are shown in FIG. 7. As shown in FIG. 7, as the air temperature TAM outside the showcase reduces, the pressure increasing value $\Delta P$ is reduced. Further, as the air temperature TR in the showcase reduces, the pressure increasing value $\Delta P$ is reduced.

Second Embodiment

Figure 8:
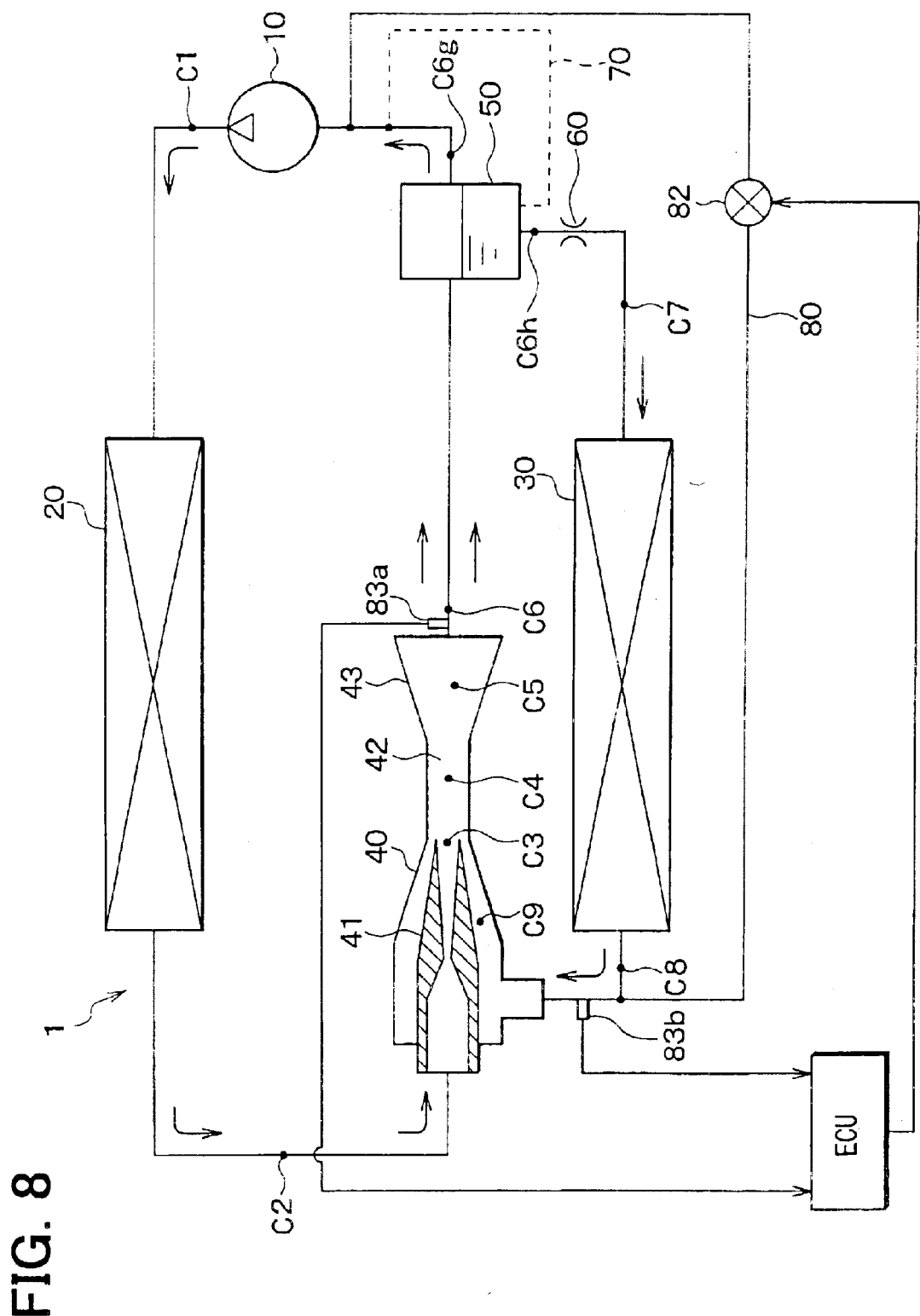
FIG. 8 is a schematic diagram showing an ejector cycle according to a second embodiment of the present invention.

In the above-described first embodiment, the second oil return passage 80 is opened and closed by the check valve 81 constructed with a mechanical valve. In the second embodiment, as shown in FIG. 8, a solenoid valve 82 is provided in the second oil return passage 80 in place of the check valve 81. Further, the pressure increasing value $\Delta P$ in the ejector 40 is detected by pressure sensors 83a, 83b. When the pressure increasing value $\Delta P$ detected by the pressure sensors 83a, 83b is equal to or smaller than a predetermined value, the solenoid valve 82 is closed by an electronic control unit (ECU). On the other hand, when the pressure increasing value $\Delta P$ detected by the pressure sensors 83a, 83b exceeds the predetermined value, the solenoid valve 82 is closed by the ECU. Here, a predetermined value when the solenoid valve 82 is closed can be set different from a predetermined value when the solenoid valve 82 is opened. In the second embodiment, the solenoid valve 82 is controlled by using the pressure increasing value $\Delta P$ as a parameter.

However, in the second embodiment, the solenoid valve 82 can be controlled by the other method. For example, first, the ejector efficiency $\eta e$ can be calculated based on a rotational speed of the compressor 10, a refrigerant temperature and refrigerant pressure, for example. Then, when the calculated ejector efficiency $\eta e$ is equal to or lower than a predetermined value, the solenoid valve 82 is opened by the ECU. On the other hand, when the calculated ejector efficiency $\eta e$ exceeds the predetermined value, the solenoid valve 82 is closed by the ECU. Here, a predetermined value of ejector efficiency $\eta e$ when the solenoid valve 82 is closed can be set different from a predetermined value of ejector efficiency $\eta e$ when the solenoid valve 82 is opened. Alternatively, the predetermined value of ejector efficiency $\eta e$ when the solenoid valve 82 is closed can be set equal to the predetermined value of ejector efficiency $\eta e$ when the solenoid valve 82 is opened.

In the second embodiment, the other parts are similar to those of the above-described first embodiment, and the advantage described in the first embodiment can be obtained.

Third Embodiment

The third embodiment of the present invention will be now described with reference to FIGS. 9–12. In the third embodiment, as shown in FIGS. 9–12, a bypass passage 90, into which high-pressure refrigerant flows while bypassing at least the nozzle 41, is directly connected to the evaporator 30. In the third embodiment, the second oil return passage 80 described in the above first and second embodiments is not provided. A three-way valve 91 is provided at a branch point of the bypass passage 90 and a high-pressure refrigerant passage coupled to the nozzle 41 of the ejector 40. The three-way valve 91 is disposed to switch a refrigerant flow into the bypass passage 90. An expansion valve 93 is provided in the bypass passage 90, and decompresses and expands refrigerant in the bypass passage 90. When the pressure increasing value ΔP in the ejector 40 is equal to or lower than a predetermined pressure, or when the ejector efficiency ηe is equal to or lower than a predetermined efficiency, refrigerant is circulated into the bypass passage 90, thereby performing the oil return mode. On the contrary, when the pressure increasing value ΔP exceeds the predetermined pressure, or when the ejector efficiency ηe exceeds the predetermined efficiency, the bypass passage 90 is closed, thereby performing the normal operation mode.

Figure 9:
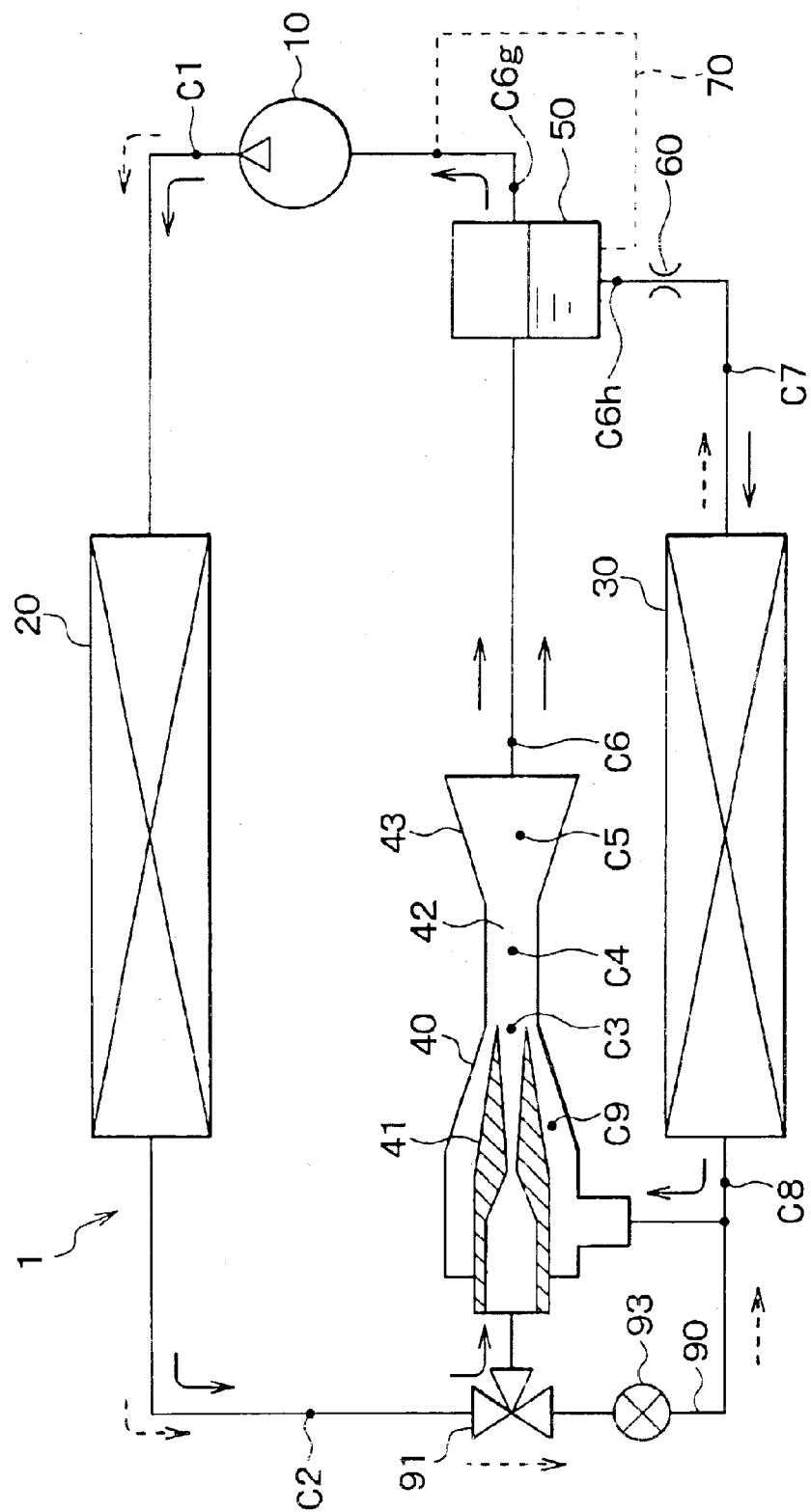
FIG. 9 is a schematic diagram showing an ejector cycle according to a third embodiment of the present invention.
Figure 10:
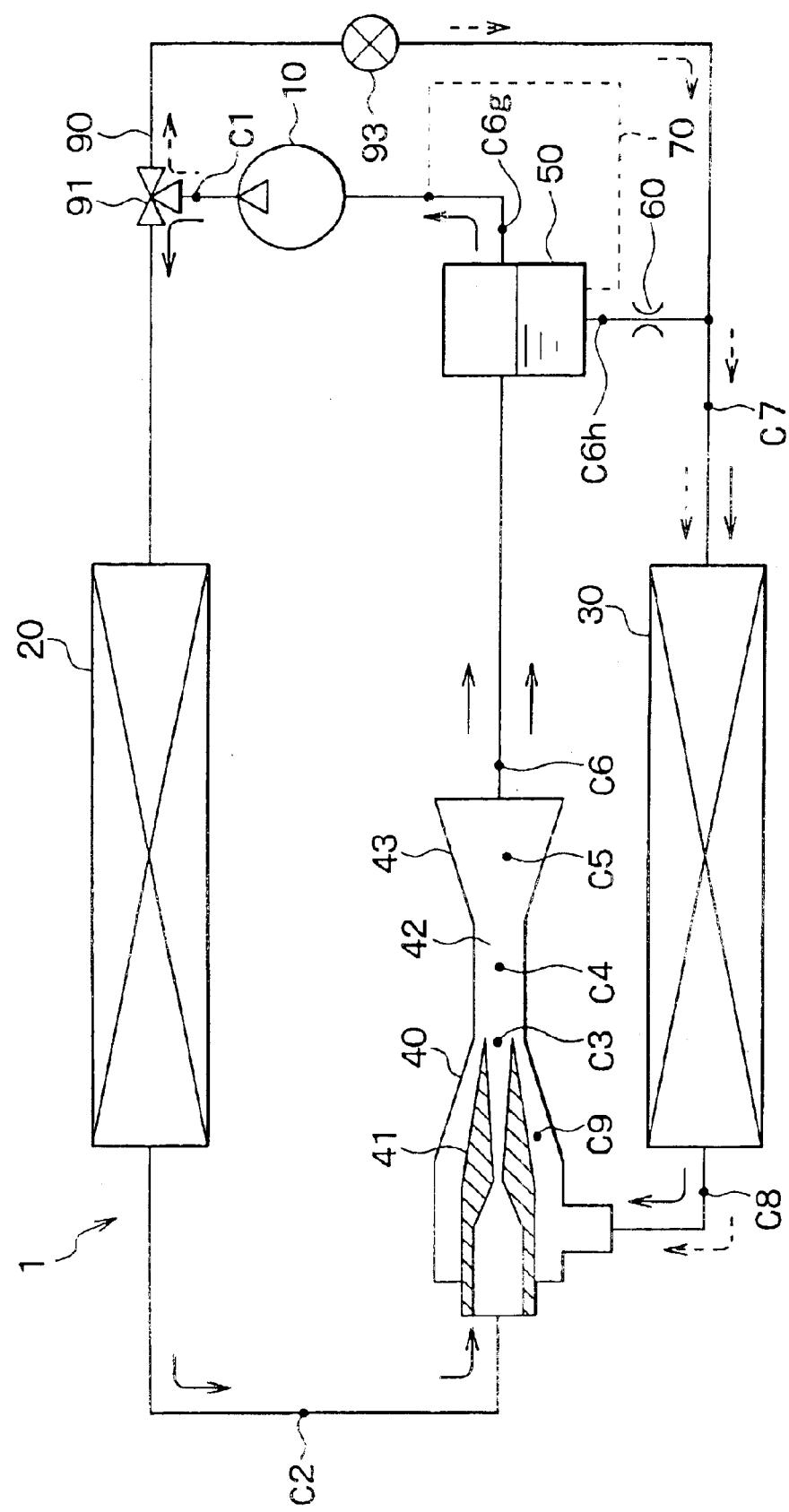
FIG. 10 is a schematic diagram showing an ejector cycle according to the third embodiment.
Figure 11:
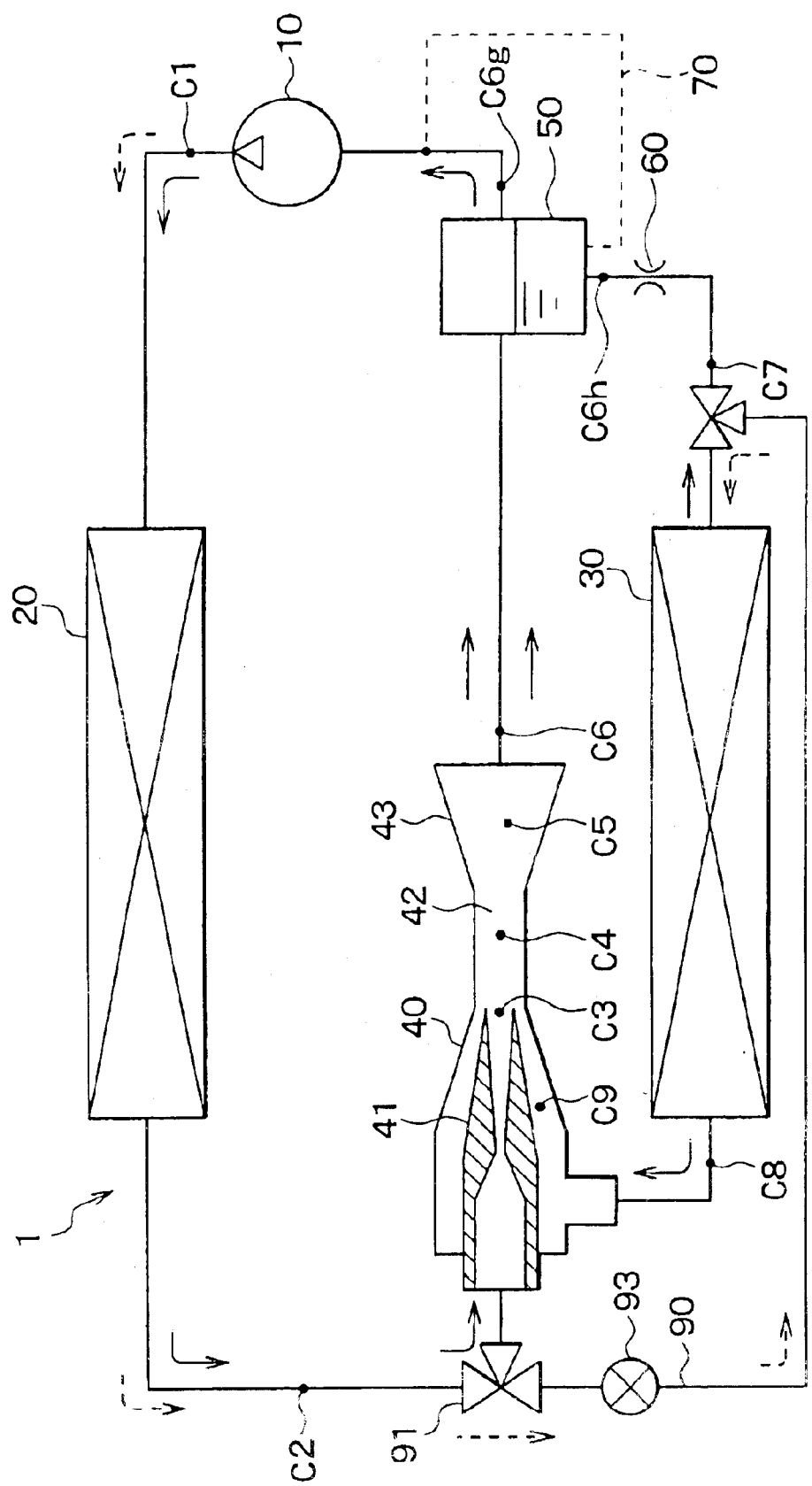
FIG. 11 is a schematic diagram showing an ejector cycle according to the third embodiment.
Figure 12:
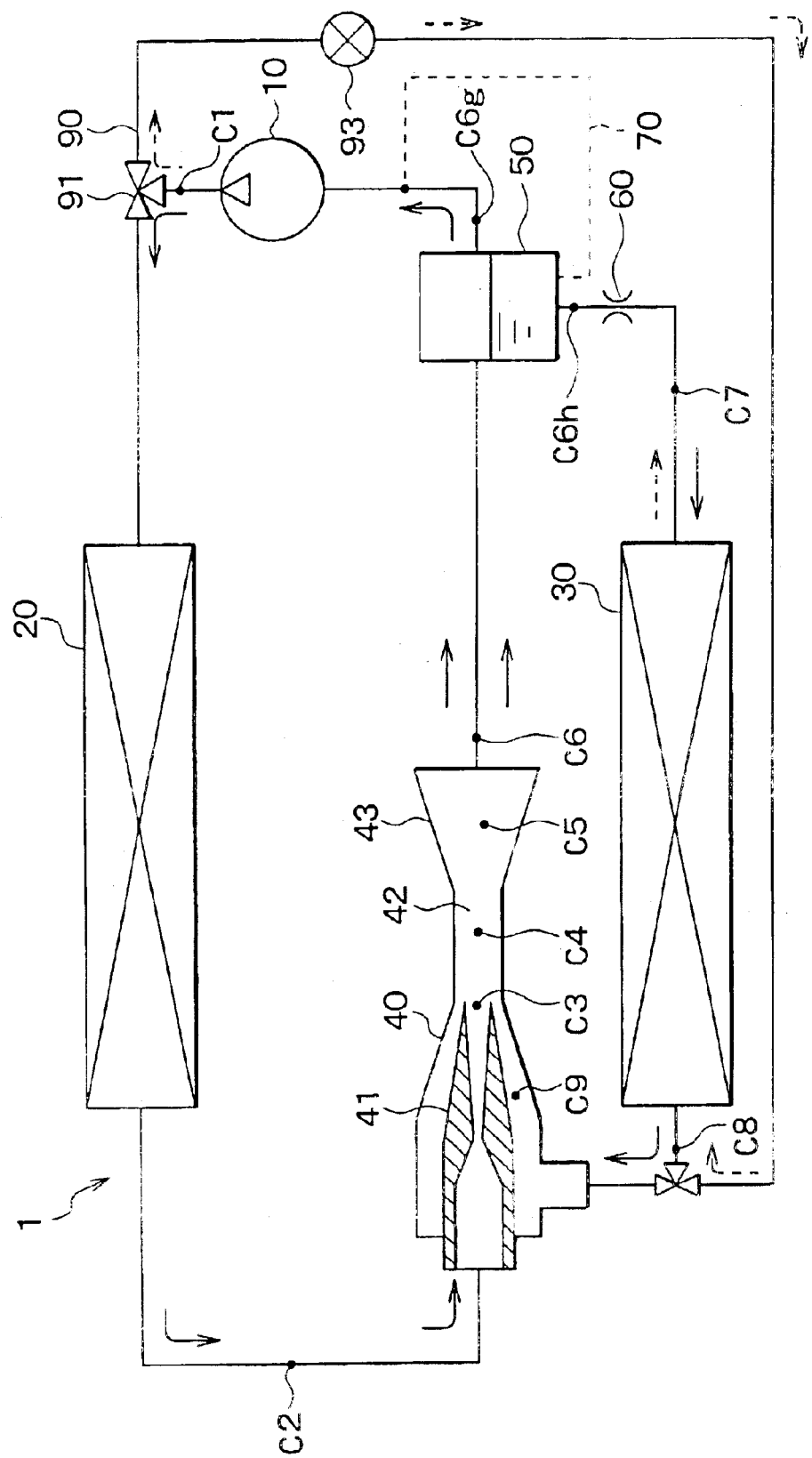
FIG. 12 is a schematic diagram showing an ejector cycle according to the third embodiment.

FIGS. 9–12 show specific examples showing the arrangement of the bypass passage 90 and the three-way valve 91. In FIGS. 9 and 11, the bypass passage 90 and the three-way valve 91 are provided such that all of the high-pressure refrigerant from the compressor 10 flows into the bypass passage 90 while bypassing the nozzle 41 of the ejector 40, and the refrigerant decompressed by the expansion valve 93 in the bypass passage 90 flows into the gas-liquid separator 50 through the evaporator 30 in the oil return mode. In FIGS. 10 and 12, the bypass passage 90 and the three-way valve 91 are provided such that a part of the high-pressure refrigerant from the compressor 10 flows into the bypass passage 90 while bypassing the radiator 20 and the nozzle 41 of the ejector 40. Even in this case, refrigerant including the lubrication oil can be introduced from the evaporator 30 to the suction side of the compressor 10 in the oil return mode.

The expansion valve 93 is a mechanical or electric decompression device that controls its throttle open degree so that a super-heating degree of refrigerant at the refrigerant outlet side of the evaporator 30 becomes a predetermined degree. However, a fixed throttle such as a capillary tube and an orifice may be used in place of the expansion valve 93.

In the ejector cycle 1 shown in FIGS. 9, 11, in the oil return mode, all high-pressure refrigerant discharged from the compressor 10 flows into the expansion valve 93 without flowing into the nozzle 41 of the ejector 40. Therefore, in the oil return mode in FIGS. 9 and 11, refrigerant circulates in the ejector cycle 1, similarly to that in a general expansion cycle.

Fourth Embodiment

Figure 13:
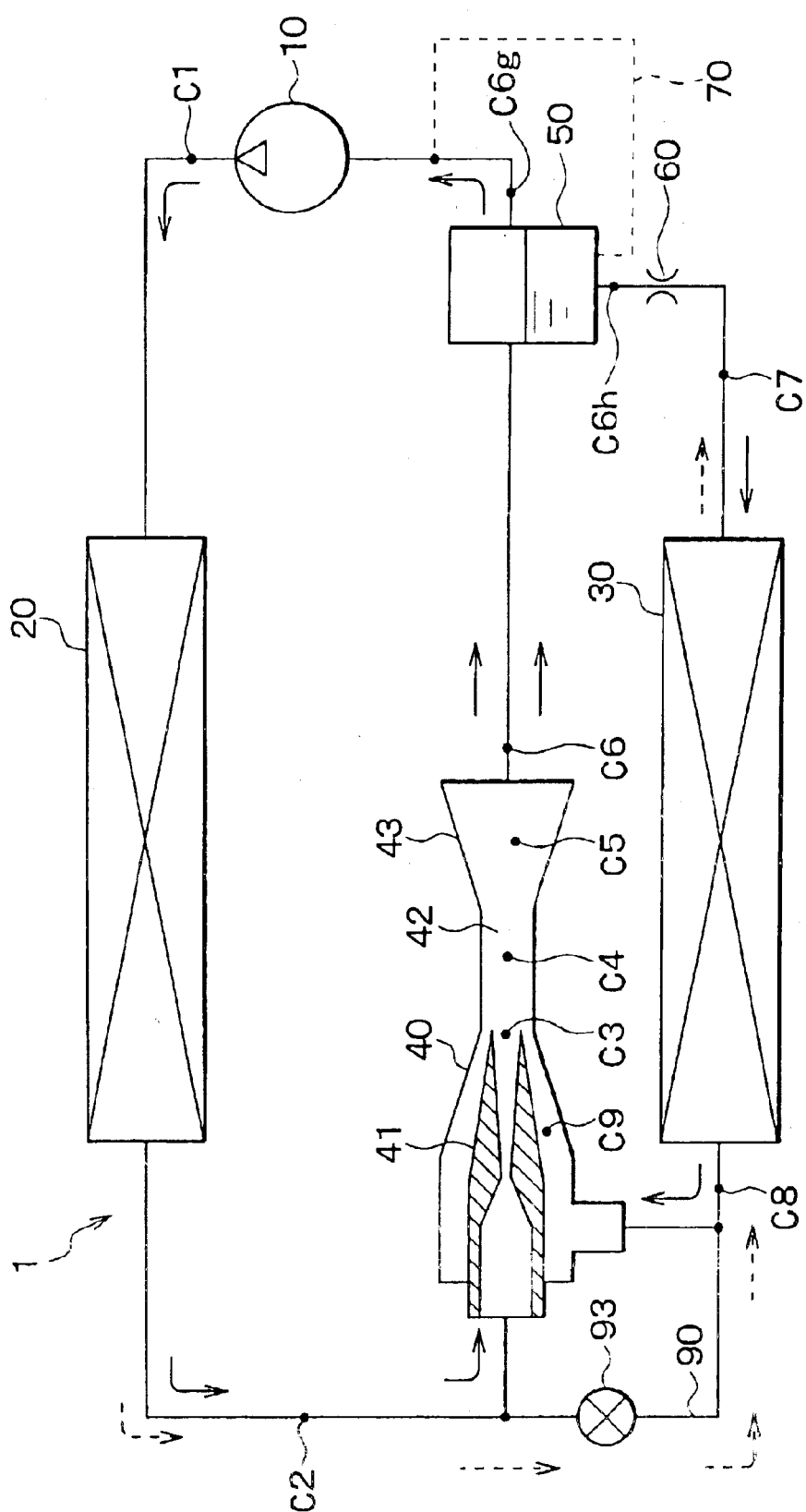
FIG. 13 is a schematic diagram showing an ejector cycle according to a fourth embodiment of the present invention.

The fourth embodiment is a modification of the third embodiment. In the fourth embodiment shown in FIG. 13, the expansion valve 93 is formed to be entirely closed in the normal operation mode, and the three-way valve 91 described in the third embodiment is eliminated. On the other hand, in the oil return mode, the expansion valve 93 is opened, thereby circulating refrigerant into the bypass passage 90 while bypassing the nozzle 41 of the ejector 40. In FIG. 13, the fourth embodiment is applied to the example shown in FIG. 9. However, the fourth embodiment can be applied to the other examples shown in FIGS. 10–12. Even in this case, in the oil return mode, refrigerant including the lubrication oil can be introduced from the evaporator 30 to the compressor 10 directly by the pumping operation of the compressor 10.

Fifth Embodiment

Figure 14:
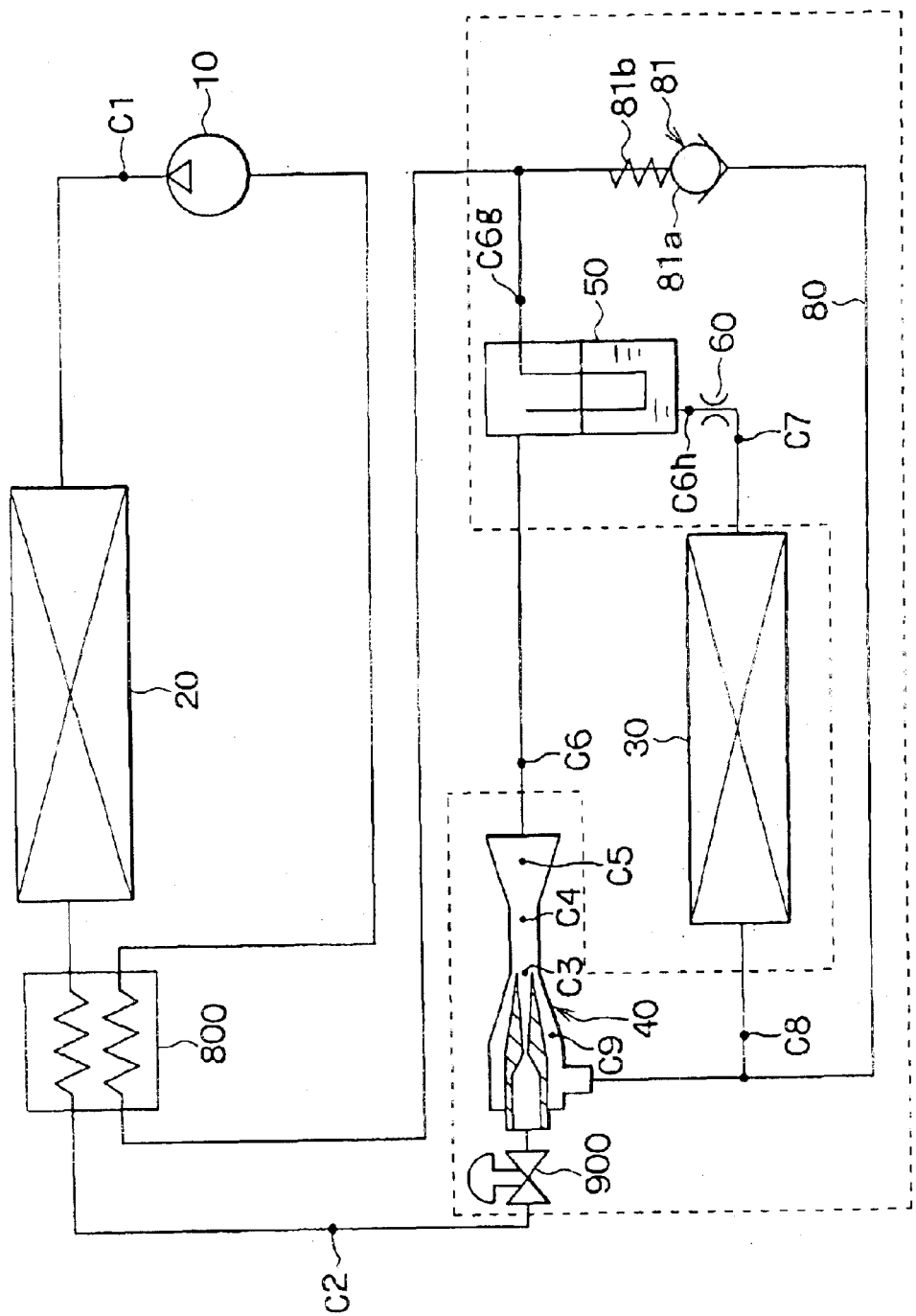
FIG. 14 is a schematic diagram showing an ejector cycle according to a fifth embodiment of the present invention.

In the fifth embodiment, as shown in FIG. 14, an internal heat exchanger 800 and a flow-amount control valve 900 are added to the ejector cycle 1 according to the first embodiment (shown in FIG. 1). The internal heat exchanger 800 performs heat-exchange operation between the high-pressure refrigerant flowing out from the radiator 20 and the low-pressure refrigerant to be sucked into the compressor 10. The flow-amount control valve 900 controls a throttle degree at the refrigerant inlet side of the nozzle 41 so as to control a super-heating degree of refrigerant at the refrigerant outlet side of the evaporator 30 at a predetermined degree.

Similarly to the above-described first embodiment, the oil return mode is automatically performed when ejector efficiency ηe reduces, or when the pumping function of the ejector 40 reduces. For example, the ejector efficiency ηe reduces when an outside air temperature is low, or when the lubrication oil equal to or more than a predetermined amount is stored in the evaporator 30. The ejector efficiency ηe is calculated similarly to the above-described first embodiment. In the fifth embodiment, when the ejector 40 has a sufficient pumping function, the oil return passage 80 is closed by the check valve 81, and refrigerant (including the lubrication oil) does not flows through the oil return passage 80.

On the contrary, when the pumping function of the ejector 40 becomes smaller, the check valve 81 is opened so that refrigerant flows through the oil return passage 80 directly by the pumping operation of the compressor 10. Thus, the refrigerant outlet side of the evaporator 30 directly communicates with the suction side of the compressor 10. Therefore, even if the pumping function of the ejector 40 is small, lubrication oil staying in the evaporator 30 flows toward the compressor 10, thereby preventing the lubrication oil from staying in the evaporator 30. Thereafter, when the lubrication oil amount staying in the evaporator 30 reduces, the check valve 81 is automatically closed, so that the operation mode is automatically changed from the oil return mode to the normal operation mode.

Accordingly, in the fifth embodiment, the other parts are similar to those of the above-described first embodiment, and the advantage similar to the above-described first embodiment can be obtained.

Sixth Embodiment

Figure 15:
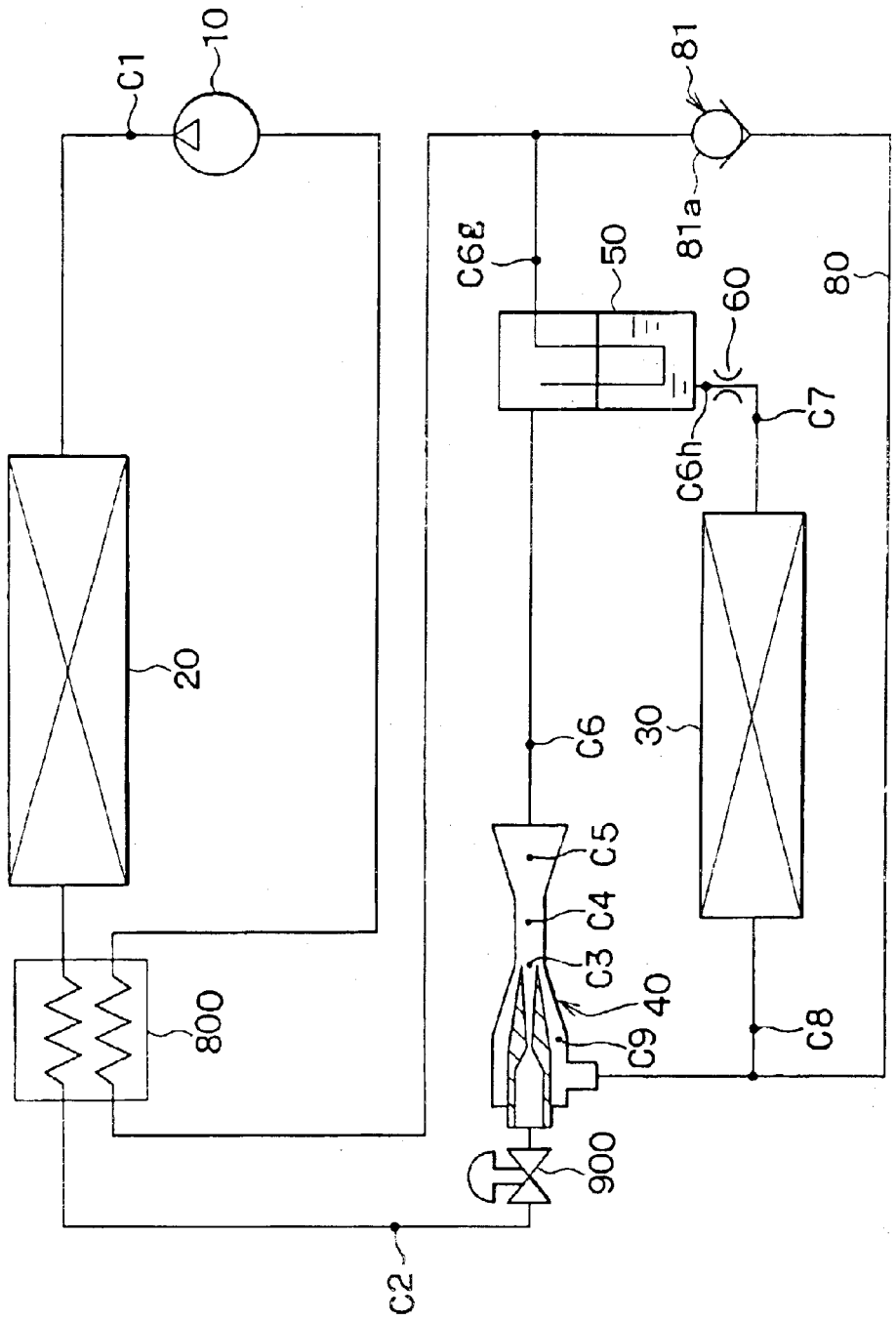
FIG. 15 is a schematic diagram showing an ejector cycle according to a sixth embodiment of the present invention.

In the sixth embodiment, as shown in FIG. 15, the spring 81b of the check valve 81 can be eliminated, or the elastic force of the spring 81b can be set very small. In this case, the check valve 81 is opened when the refrigerant pressure at the refrigerant outlet side of the evaporator 30 becomes higher than the refrigerant pressure at the refrigerant suction side of the compressor 10. That is, the check valve 81 opens the oil return passage 80 when the refrigerant pressure at the refrigerant outlet side of the evaporator 30 becomes higher than the refrigerant pressure at the refrigerant suction side of the compressor 10, and closes the oil return passage 80 when the refrigerant pressure at the refrigerant outlet side of the evaporator 30 becomes smaller than the refrigerant pressure at the refrigerant suction side of the compressor 10. In the sixth embodiment, the other parts are similar to those of the above-described fifth embodiment.

Seventh Embodiment

Figure 16:
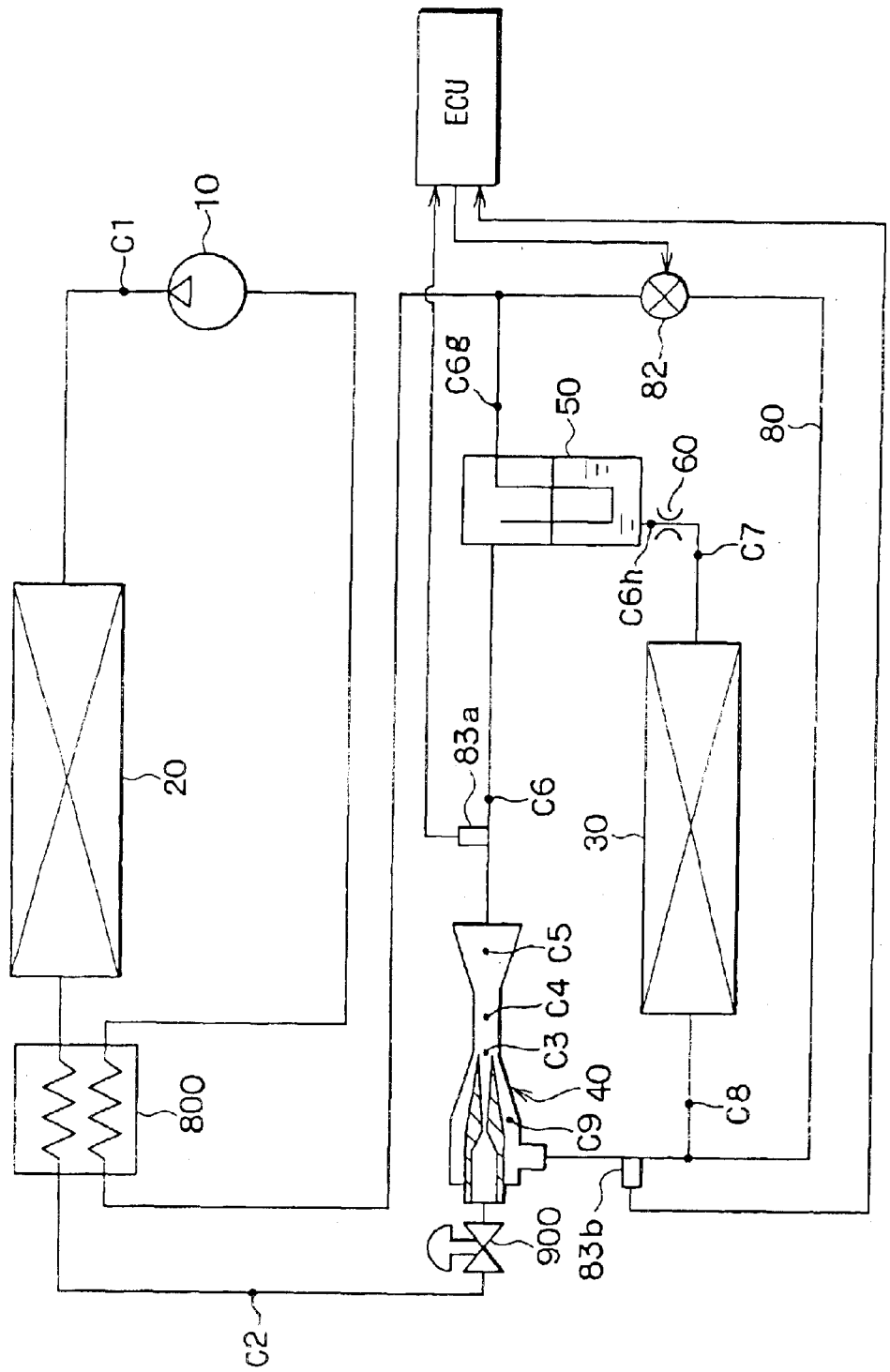
FIG. 16 is a schematic diagram showing an ejector cycle according to a seventh embodiment of the present invention.

In the seventh embodiment is a modification of the above-described fifth embodiment. As shown in FIG. 16, similarly to the above-described second embodiment, the solenoid valve 82 is provided in the oil return passage 80 in place of the check valve 81. Further, the pressure increasing value ΔP in the ejector 40 is detected by the pressure sensors 83a, 83b. When the pressure increasing value ΔP detected by the pressure sensors 83a, 83b is equal to or smaller than a predetermined value, the solenoid valve 82 is closed by the ECU. On the other hand, when the pressure increasing value ΔP detected by the pressure sensors 83a, 83b exceeds the predetermined value, the solenoid valve 82 is opened by the ECU. Here, the predetermined value when the solenoid valve 82 is closed can be set different from or equal to the predetermined value when the solenoid valve 82 is opened. In the seventh embodiment, the solenoid valve 82 is controlled by using the pressure increasing value ΔP as a parameter.

However, in the seventh embodiment, the solenoid valve 82 can be controlled by the other method. For example, first, the ejector efficiency ηe can be calculated based on a rotational speed of the compressor 10, a refrigerant temperature and refrigerant pressure, for example. Then, when the calculated ejector efficiency ηe is equal to or lower than a predetermined value, the solenoid valve 82 is opened by the ECU. On the other hand, when the calculated ejector efficiency ηe exceeds the predetermined value, the solenoid valve 82 is closed by the ECU. Here, a predetermined value of ejector efficiency ηe when the solenoid valve 82 is closed can be set different from or equal to a predetermined value of ejector efficiency ηe when the solenoid valve 82 is opened.

In the seventh embodiment, the other parts are similar to those of the above-described fifth embodiment, and advantages described in the fifth embodiment can be obtained.

Eighth Embodiment

Figure 17:
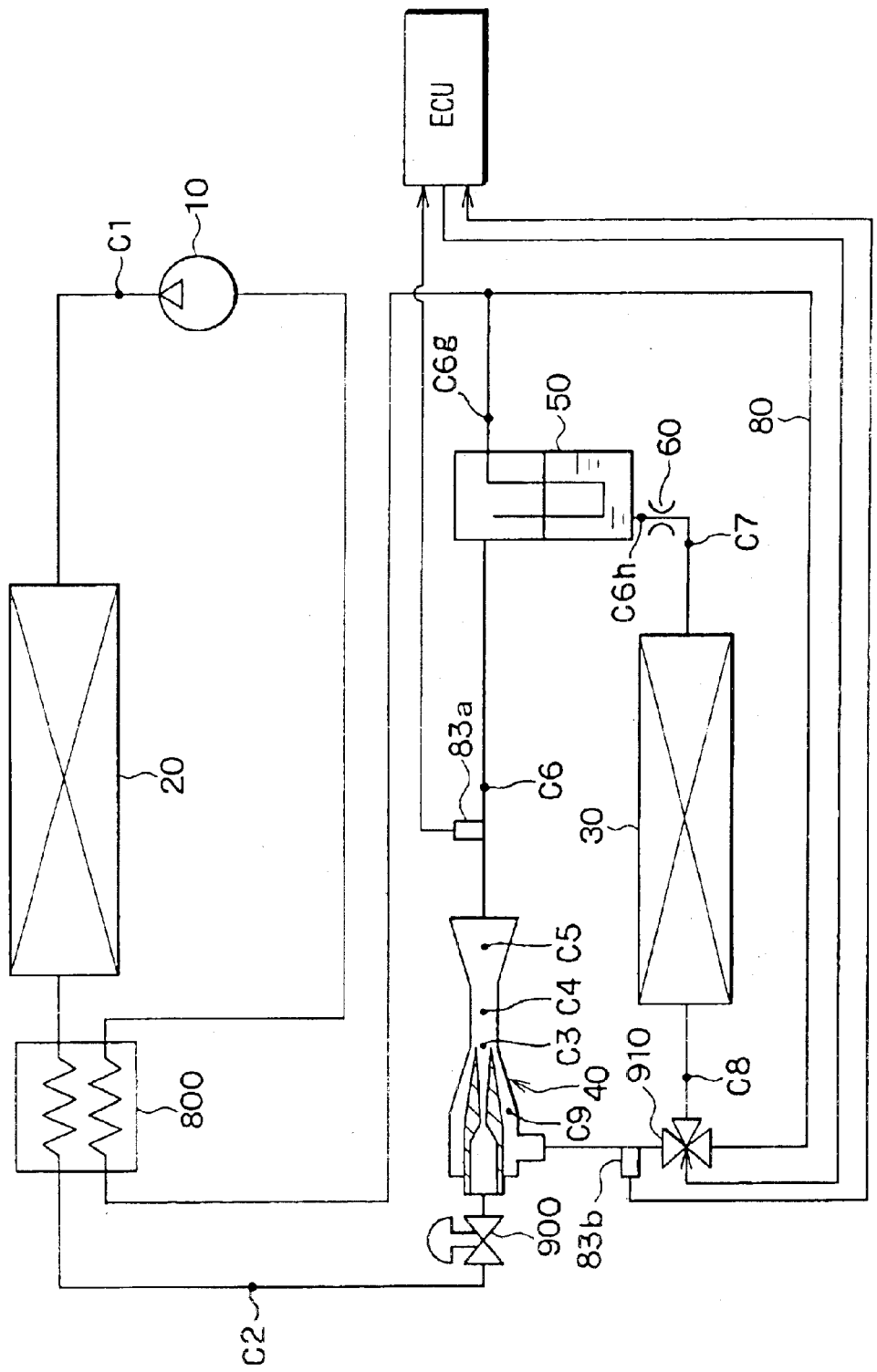
FIG. 17 is a schematic diagram showing an ejector cycle according to an eighth embodiment of the present invention.
Figure 18:
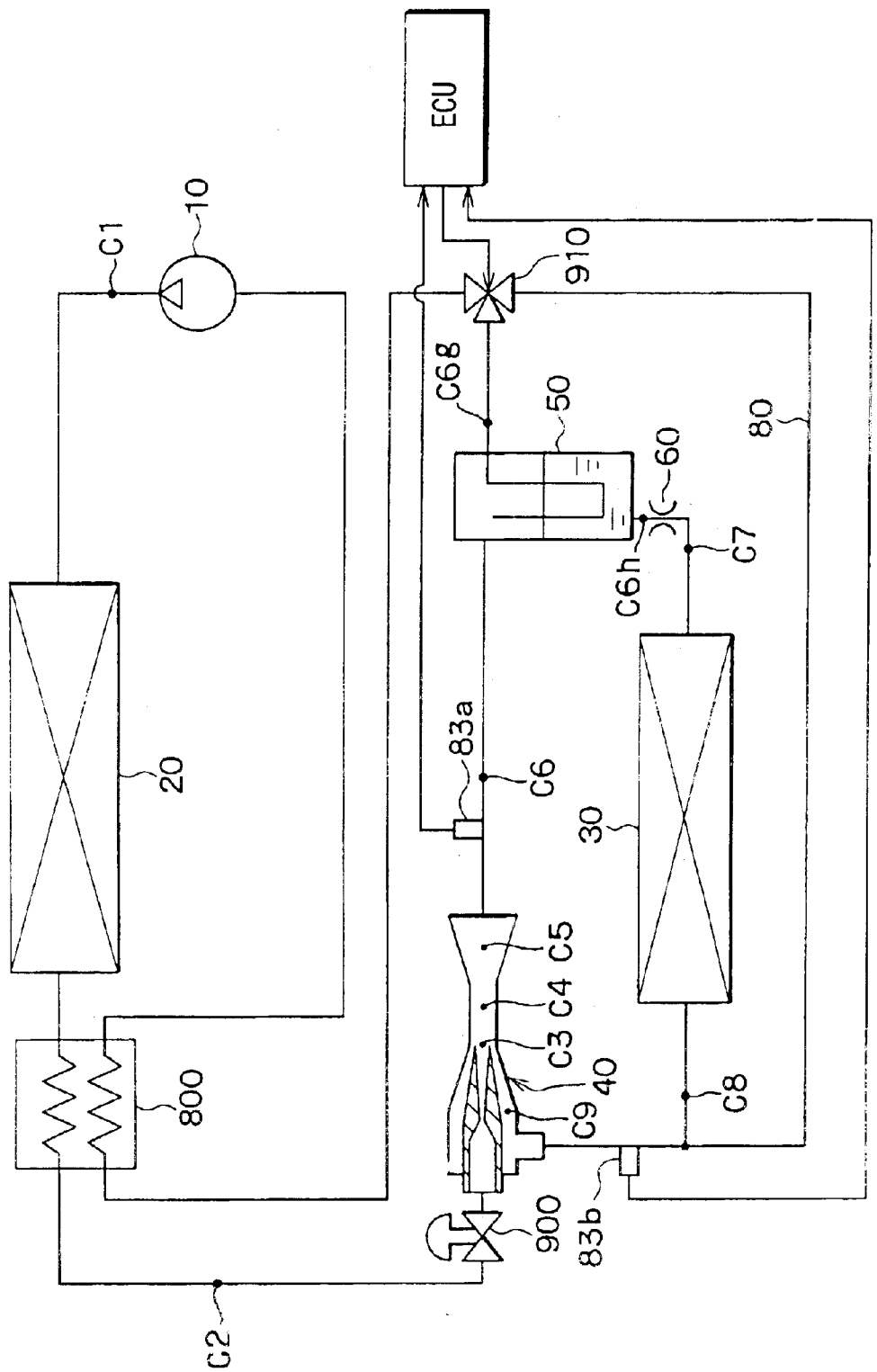
FIG. 18 is a schematic diagram showing an ejector cycle according to the eighth embodiment of the present invention.

In the eighth embodiment, a three-way solenoid valve 910 is provided at a branch portion of the low-pressure refrigerant passage and the oil return passage 80 as shown in FIG. 17, or at a joint portion thereof as shown in FIG. 18. When the pressure increasing value ΔP in the ejector 40 becomes equal to or lower than predetermined value, the oil return passage 80 is opened by the three-way solenoid valve 90. On the contrary, when the pressure increasing value ΔP in the ejector 40 becomes higher than the predetermined value, the oil return passage 80 is closed by the three-way solenoid valve 90.

Ninth Embodiment

Figure 19A:
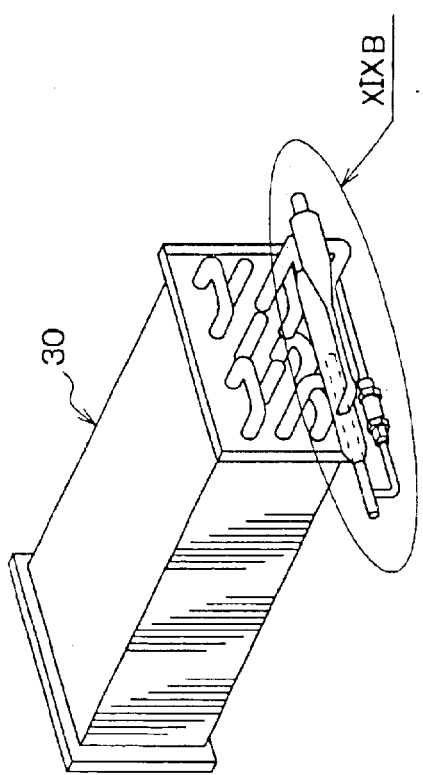
FIG. 19A is a schematic diagram showing an integrated body of an evaporator and an ejector in an ejector cycle according to a ninth embodiment of the present invention.
Figure 19B:
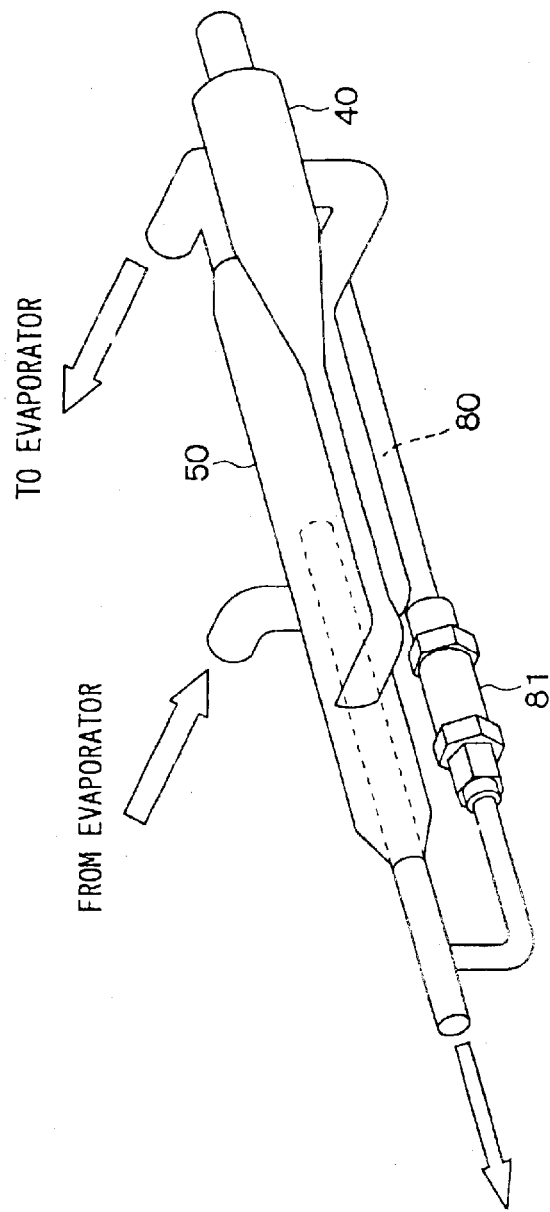
FIG. 19B is an enlarged schematic diagram showing a portion XIX B in FIG. 19A.

In the ninth embodiment, as shown in FIGS. 19A, 19B, a piping member forming the oil return passage 80, the ejector 40, the gas-liquid separator 50, the check valve 81, the flow-amount control valve 900 and the like are integrated together. That is, the portion enclosed by a broken line in FIG. 14 is constructed with an integrated unit. Further, the ninth embodiment can be applied to the other embodiments, without limited to the structure of FIG. 14 in the fifth embodiment. For example, at least the pipe member for forming the oil return passage 80, the valve 81 and the gas-liquid separator 50 can be integrated to form an integrated unit.

A tenth embodiment of the present invention will be now described with reference to FIGS. 20–23. In the tenth embodiment, an ejector cycle of the present invention is typically used for a dual air conditioner having a front air-conditioning unit for performing an air conditioning operation for a front seat area in the passenger compartment, and a rear air-conditioning unit for performing an air conditioning operation for a rear seat area in the passenger compartment. In this case, the front air-conditioning unit includes a front evaporator 30a for cooling air to be blown into the front seat area, and a rear evaporator 30b for cooling air to be blown into the rear seat area in the passenger compartment. A three-way valve 900 is disposed to switch a refrigerant flow, and throttles 60a, 60b are provided. In FIGS. 20–23, the other parts are similar to the components indicated by the same reference numbers in the above-described embodiments.

Figure 20:
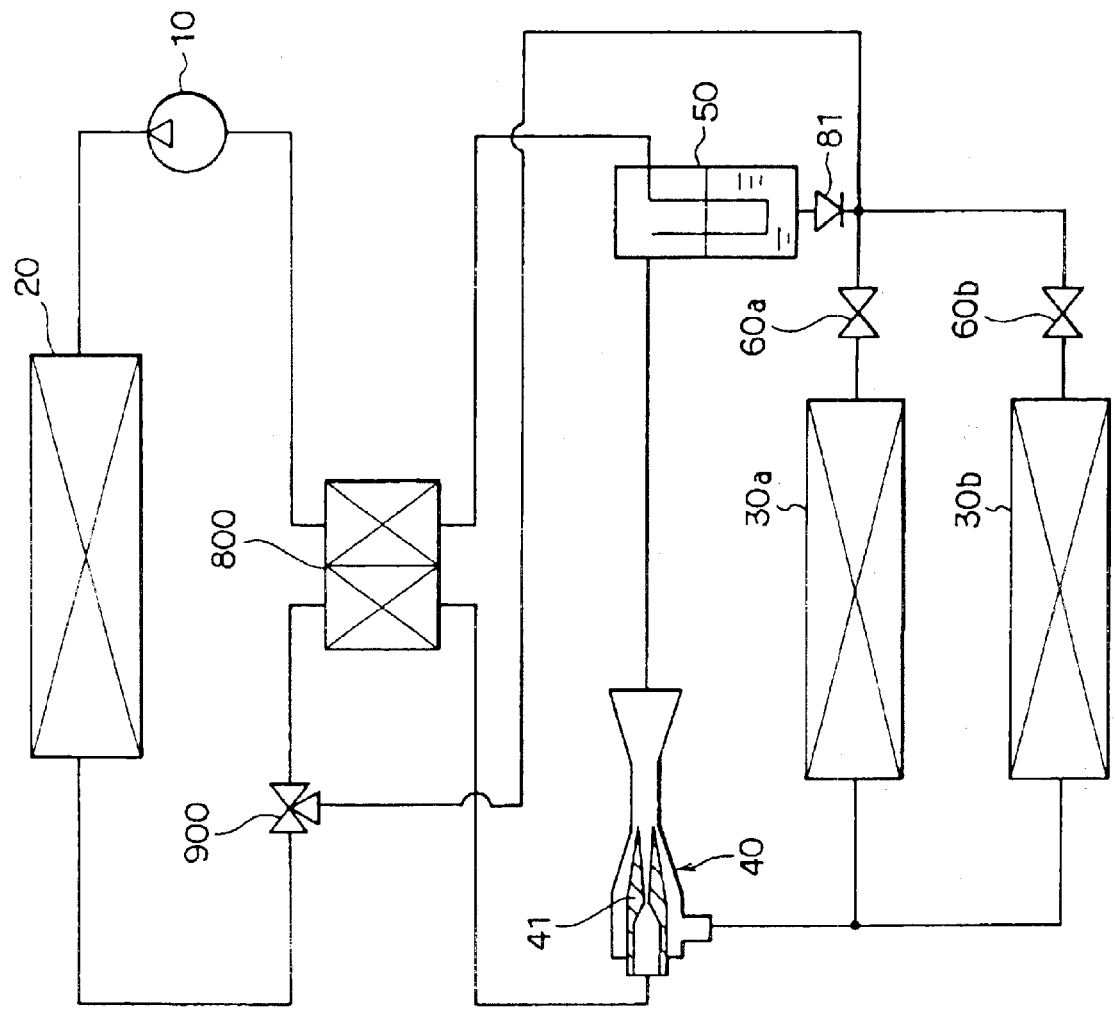
FIG. 20 is a schematic diagram showing an ejector cycle according to an example of a tenth embodiment of the present invention.

In the example of FIG. 20, in a normal operation mode, the three-way valve 900 is switched such that, refrigerant from the compressor 10 flows through the condenser 20, the three-way valve 900, the high-pressure refrigerant passage of the interior heat exchanger 800, the nozzle 41, the gas-liquid separator 50, the interior heat exchanger 800 in this order, and returns to the compressor 10. Simultaneously, refrigerant in the gas-liquid separator 50 flows through the front and rear evaporator 30a, 30b after passing through the throttles 60a, 60b, and is sucked into the ejector 40. In this case, it is possible to introduce the refrigerant only into the front evaporator 30a without being introduced into the rear evaporator 30b. On the other hand, in a bypass mode (oil return mode), refrigerant from the compressor 10 passes through the condenser 20, the three-way valve 900, and directly flows into the front and rear evaporators 30a, 30b after passing through the throttles 60a, 60b. Thereafter, refrigerant from the front and rear evaporators 30a, 30b flows into the ejector 40 while bypassing the nozzle 41, and flows into the gas-liquid separator 50. Further, in FIG. 20, the check valve 81 prevents the refrigerant from being reversely flowing.

Figure 21:
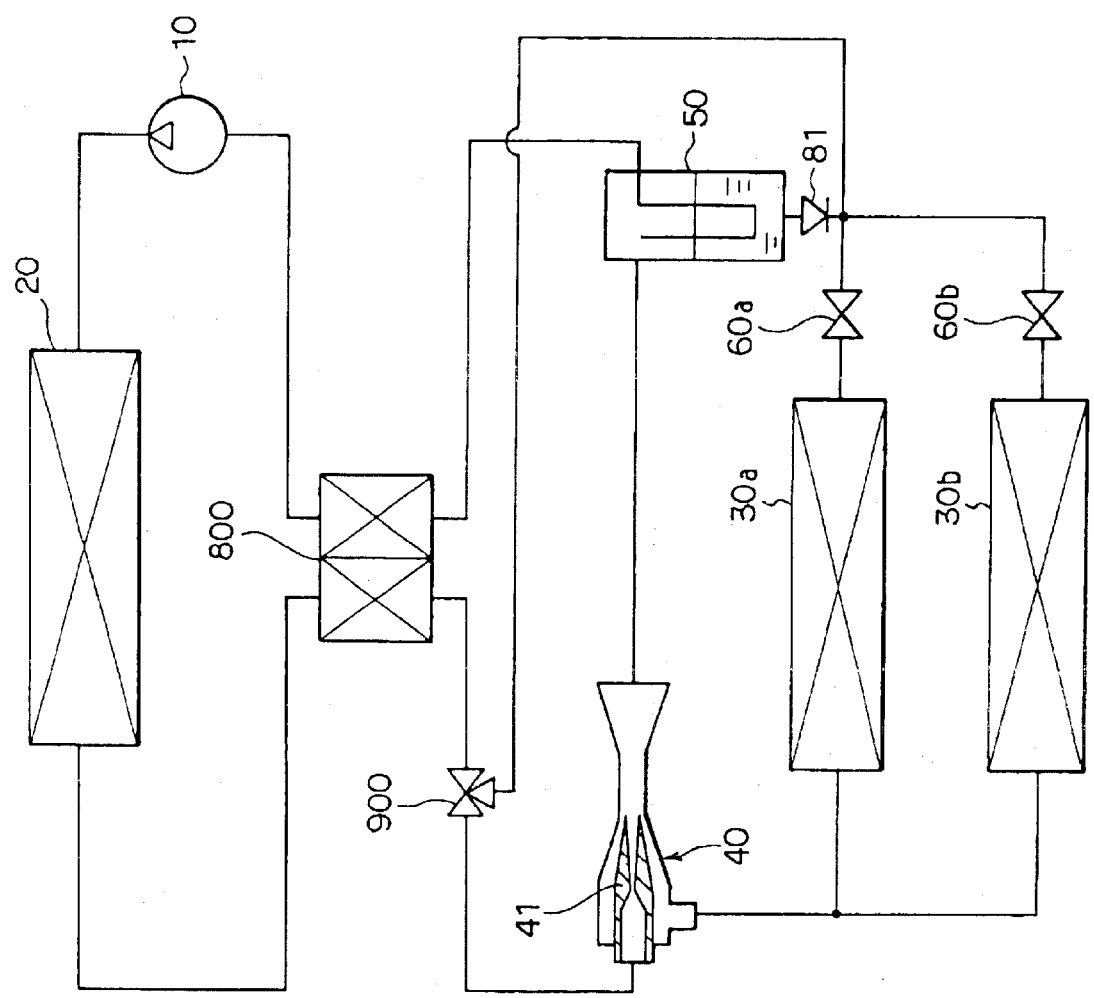
FIG. 21 is a schematic diagram showing an ejector cycle according to an another example of the tenth embodiment.

In the example of FIG. 20, the three-way valve 900 is disposed upstream from the high-pressure refrigerant passage of the interior heat exchanger 800. However, in an example of FIG. 21, the three-way valve 900 is disposed downstream from the high-pressure refrigerant passage of the interior heat exchanger 800. In FIG. 21, the other parts are similar to those in FIG. 20, and operation is also similar to that of FIG. 20.

Figure 22:
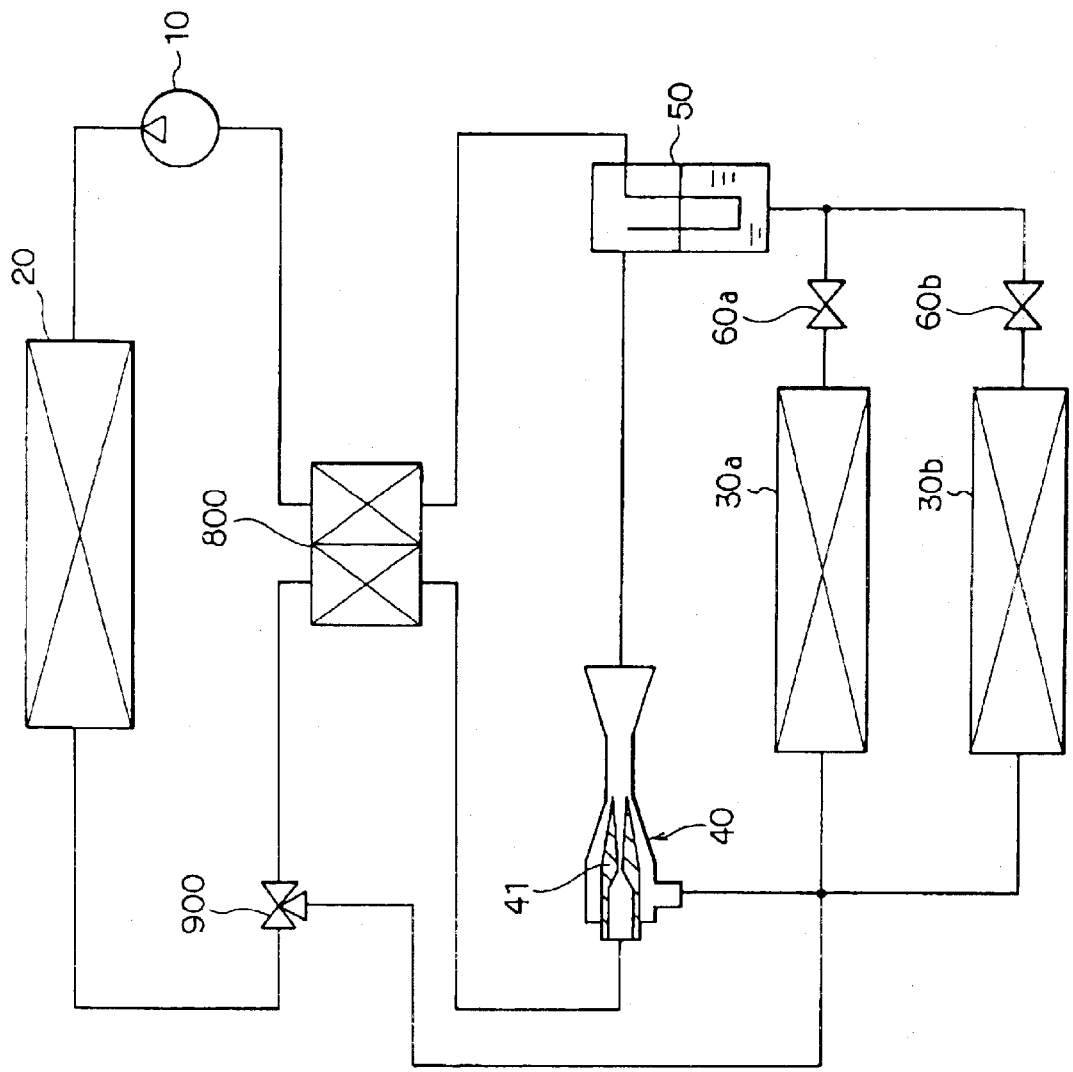
FIG. 22 is a schematic diagram showing an ejector cycle according to a further another example of the tenth embodiment.

In an example of FIG. 22, in the normal operation mode, the three-way valve 900 is switched such that, refrigerant from the compressor 10 flows through the condenser 20, the three-way valve 900, the interior heat exchanger 800, the nozzle 41, the gas-liquid separator 50, the high-pressure refrigerant passage of the interior heat exchanger 800 in this order, and returns to the compressor 10. Simultaneously, refrigerant in the gas-liquid separator 50 flows through the front and rear evaporator 30a, 30b after passing through the throttles 60a, 60b, and is sucked into the ejector 40. In this case, it is possible to introduce the refrigerant only into the front evaporator 30a without being introduced into the rear evaporator 30b. On the other hand, in the bypass mode (oil return mode), refrigerant from the compressor 10 passes through the condenser 20, the three-way valve 900, and directly flows into the front and rear evaporators 30a, 30b while bypassing the ejector 40. Thereafter, refrigerant from the front and rear evaporators 30a, 30b passes through the throttles 60a, 60b, and is introduced into the gas-liquid separator 50. In this case, the throttles 60a, 60b are generally fully opened without having a throttle function. Further, in FIG. 22, the three-way valve 900 has a decompression function, or a decompression unit can be disposed upstream from the front and rear evaporators 30a, 30b. Even in this case, it is possible to introduce the refrigerant only into the front evaporator 30a without being introduced into the rear evaporator 30b.

Figure 23:
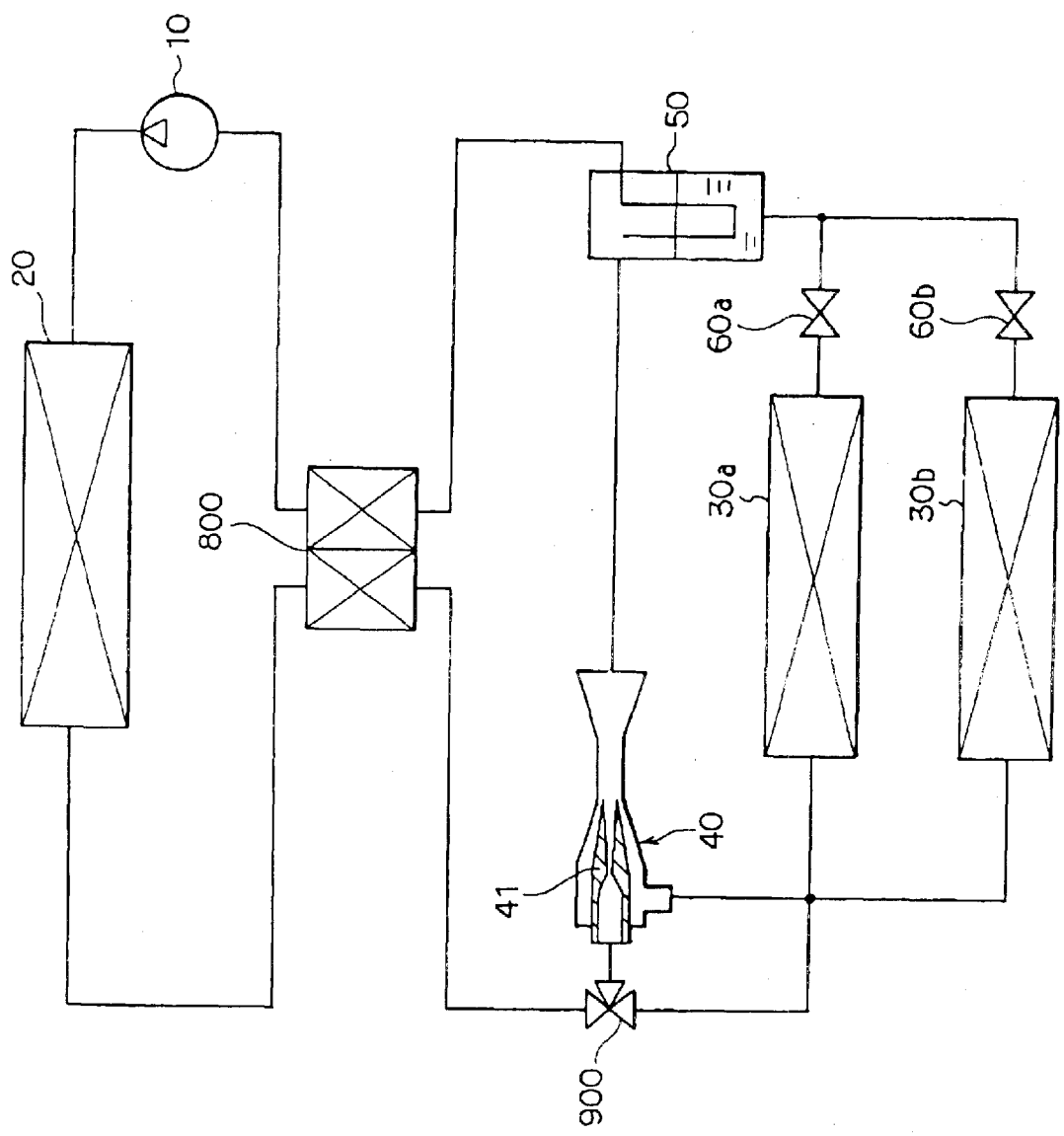
FIG. 23 is a schematic diagram showing an ejector cycle according to a further another example of the tenth embodiment.

In the example of FIG. 22, the three-way valve 900 is disposed upstream from the high-pressure refrigerant passage of the interior heat exchanger 800. However, in an example of FIG. 23, the three-way valve 900 is disposed downstream from the high-pressure refrigerant passage of the interior heat exchanger 800. In FIG. 23, the other parts are similar to those in FIG. 22, and operation is also similar to that of FIG. 22.

Although the present invention has been fully described in connection with the preferred embodiments thereof with reference to the accompanying drawings, it is to be noted that various changes and modifications will become apparent to those skilled in the art.

For example, in the above embodiments, carbon dioxide is used as refrigerant. However, without being limited to carbon dioxide, for example, hydro carbon, fleon and the like may be used as the refrigerant. In the above embodiments, the pressure of high-pressure refrigerant is set equal to or higher than the critical pressure of the refrigerant. However, the pressure of high-pressure refrigerant can be set lower than the critical pressure of the refrigerant. In the above embodiments, the ejector cycle 1 according to the present invention is typically used for the vapor compression refrigerator used for the showcase. However, the ejector cycle 1 of the present invention can be used for an air conditioner and the like.

In the present invention, in the oil return mode (bypass mode), the lubrication oil staying in the evaporator 30 is directly sucked or directly pushed outside by the pumping operation of the compressor 10. Accordingly, only when the lubrication oil staying in the evaporator 30 is directly sucked or directly pushed outside by the pumping operation of the compressor 10, the oil return mode is not limited to the above-described embodiments. Further, in the fifth to eighth embodiments, any one of the internal heat exchanger 800 and the flow-amount control valve 900 may be eliminated.

Further, in the above-described embodiment, the bypass mode, where the refrigerant from the condenser 20 bypasses at least the nozzle 41 of the ejector 40, can be performed, during an inside air introduction mode in the winter in a vehicle air conditioner. In the inside air introduction mode of the vehicle air conditioner, air inside the passenger compartment is introduced. Therefore, the evaporator is operated for performing a dehumidifying operation. In the inside air introduction mode in the winter, the pressure of the high-pressure refrigerant is relatively low and the pressure of the low-pressure refrigerant is relatively high. Therefore, the expansion loss energy becomes smaller in the ejector 40, and the bypass mode where refrigerant bypassing at least the nozzle 41 of the ejector 40 is necessary. Accordingly, the bypass mode can be performed when the inside air introduction mode is set in the winter in the vehicle air conditioner.

In the above-described embodiments, as switching means for switching the refrigerant flow, the valves 81, 82, 900, 910 are used. However, the other switching device for switching the refrigerant flow can be used as the switching means.

Such changes and modifications are to be understood as being within the scope of the present invention as defined by the appended claims.

What is claimed is:

1. An ejector cycle comprising:
 a compressor for compressing and discharging refrigerant;
 a high-pressure heat exchanger for radiating heat of high-pressure refrigerant discharged from the compressor;
 a low-pressure heat exchanger for evaporating low-pressure refrigerant after being decompressed;
 an ejector including a nozzle for decompressing and expanding the high-pressure refrigerant flowing from the high-pressure heat exchanger, the ejector being disposed to suck refrigerant evaporated in the low-pressure heat exchanger by a high-speed refrigerant stream injected from the nozzle, and to increase pressure of refrigerant to be sucked into the compressor by converting expansion energy of refrigerant to pressure energy thereof;
 a gas-liquid separator for separating refrigerant flowing from the ejector, into liquid refrigerant and gas refrigerant, the gas-liquid separator including a gas refrigerant outlet connected to a refrigerant suction side of the compressor and a liquid refrigerant outlet connected to a refrigerant inlet side of the low-pressure heat exchanger;
 a pipe member defining a refrigerant passage, through which a refrigerant outlet side of the low-pressure heat exchanger is coupled to the refrigerant suction side of the compressor; and
 a switching means provided in the refrigerant passage to open and close the refrigerant passage, wherein,
 when the switching means opens the refrigerant passage, at least refrigerant in the low-pressure heat exchanger is introduced to the refrigerant suction side of the compressor while bypassing the ejector.

2. The ejector cycle according to claim 1, wherein:
 in a normal operation mode where the switching means closes the refrigerant passage, the refrigerant in the low-pressure heat exchanger is sucked into the ejector by the high-speed refrigerant steam jetted from the nozzle; and
 in an oil return mode where the switching means opens the refrigerant passage, lubrication oil staying in the low-pressure heat exchanger is introduced to the compressor, together with the refrigerant flowing from the low-pressure heat exchanger to the refrigerant suction side of the compressor through the refrigerant passage.

3. The ejector cycle according to claim 1, wherein the switching means is disposed to open the refrigerant passage, when a refrigerant pressure at the refrigerant outlet side of the low-pressure heat exchanger becomes higher than a refrigerant pressure at the refrigerant suction side of the compressor, and when a pressure different between the refrigerant pressure at the refrigerant outlet side of the low-pressure heat exchanger and the refrigerant pressure at the refrigerant suction side of the compressor is larger than a predetermined value.

4. The ejector cycle according to claim 3, wherein the switching means is a valve including a valve port for opening the refrigerant passage, a valve body for opening and closing the valve port, and a spring member for applying elastic force to the valve body in a direction for closing the valve port.

5. The ejector cycle according to claim 1, wherein the switching means is disposed to open the refrigerant passage when an ejector efficiency of the ejector becomes lower than a first predetermined value, and to close the refrigerant passage when the ejector efficiency of the ejector becomes higher than a second predetermined value.

6. The ejector cycle according to claim 5, wherein the first predetermined value is equal to the second predetermined value.

7. The ejector cycle according to claim 5, wherein the first predetermined value is different from the second predetermined value.

8. The ejector cycle according to claim 1, further comprising:
  a pressure difference determining member for determining a pressure difference between the refrigerant outlet side of the low-pressure heat exchanger and the refrigerant suction side of the compressor; and
  a control unit which controls operation of the switching means based on the pressure difference.

9. The ejector cycle according to claim 1, wherein the switching means is a check valve that is disposed to prevent a refrigerant flow from the refrigerant suction side of the compressor to the refrigerant outlet side of the low-pressure heat exchanger when the switching means opens the refrigerant passage.

10. The ejector cycle according to claim 1, further comprising
  an internal heat exchanger disposed in the refrigerant passage, for performing heat exchange between the high-pressure refrigerant from the high-pressure heat exchanger and the refrigerant from the low-pressure heat exchanger.

11. The ejector cycle according to claim 1, further comprising:
  a flow amount control unit, disposed upstream from the nozzle of the ejector, for controlling a flow amount of refrigerant flowing into the nozzle of the ejector.

12. The ejector cycle according to claim 1, wherein at least the pipe member, the switching means and the gas-liquid separator are integrated to form an integrated unit.

13. The ejector cycle according to claim 1, wherein the refrigerant is one of carbon dioxide, a hydrocarbon and freon.

14. An ejector cycle comprising:
  a compressor for compressing and discharging refrigerant;
  a high-pressure heat exchanger for radiating heat of high-pressure refrigerant discharged from the compressor;
  a low-pressure heat exchanger for evaporating low-pressure refrigerant after being decompressed;
  an ejector including a nozzle for decompressing and expanding the high-pressure refrigerant flowing from the high-pressure heat exchanger, the ejector being disposed to suck refrigerant evaporated in the low-pressure heat exchanger by a high-speed refrigerant stream injected from the nozzle, and to increase pressure of refrigerant to be sucked into the compressor by converting expansion energy of refrigerant to pressure energy thereof;
  a gas-liquid separator for separating refrigerant flowing from the ejector, into liquid refrigerant and gas refrigerant, the gas-liquid separator including a gas refrigerant outlet connected to a refrigerant suction side of the compressor and a liquid refrigerant outlet connected to a refrigerant inlet side of the low-pressure heat exchanger;
  a pipe member defining a refrigerant passage, through which refrigerant discharged from the compressor is introduced toward the low-pressure heat exchanger while bypassing the nozzle of the ejector; and
  a switching means provided in the refrigerant passage to open and close the refrigerant passage, wherein,
  when the switching means opens the refrigerant passage, at least refrigerant in the low-pressure heat exchanger is introduced to the refrigerant suction side of the compressor while bypassing the nozzle of the ejector.

15. The ejector cycle according to claim 14, further comprising
  a decompression device, disposed in the refrigerant passage, for decompressing refrigerant discharged from the compressor, wherein:
  in a normal operation mode, the switching means closes the refrigerant passage, and the high-pressure refrigerant from the high-pressure heat exchanger is decompressed in the nozzle of the ejector while sucking refrigerant in the evaporator; and
  in an oil return mode, the switching means opens the refrigerant passage, and the high-pressure refrigerant discharged from the compressor is decompressed in the decompression device and flows through the low-pressure heat exchanger.

16. The ejector cycle according to claim 14, wherein the switching means is disposed to open the refrigerant passage, when a refrigerant pressure at the refrigerant outlet side of the low-pressure heat exchanger becomes higher than a refrigerant pressure at the refrigerant suction side of the compressor, and when a pressure difference between the refrigerant pressure at the refrigerant outlet side of the low-pressure heat exchanger and the refrigerant pressure at the refrigerant suction side of the compressor is larger than a predetermined value.

17. The ejector cycle according to claim 14, wherein the switching means is disposed to open the refrigerant passage when an ejector efficiency of the ejector is lower than a predetermined value.

* * * * *